United States Patent
Zhao et al.

(10) Patent No.: US 12,256,081 B2
(45) Date of Patent: Mar. 18, 2025

(54) INTRA PREDICTION METHOD AND APPARATUS FOR VIDEO SEQUENCE

(71) Applicant: HUAWEI TECHNOLOGIES CO., LTD., Guangdong (CN)

(72) Inventors: Yin Zhao, Hangzhou (CN); Haitao Yang, Shenzhen (CN); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/665,853

(22) Filed: May 16, 2024

(65) Prior Publication Data

US 2024/0305784 A1   Sep. 12, 2024

Related U.S. Application Data

(63) Continuation of application No. 17/514,289, filed on Oct. 29, 2021, now Pat. No. 12,022,081, which is a
(Continued)

(30) Foreign Application Priority Data

Apr. 30, 2019 (CN) .......................... 201910370987.9

(51) Int. Cl.
  *H04N 19/132* (2014.01)
  *H04N 19/159* (2014.01)
  (Continued)

(52) U.S. Cl.
  CPC ......... *H04N 19/132* (2014.11); *H04N 19/159* (2014.11); *H04N 19/176* (2014.11);
  (Continued)

(58) Field of Classification Search
  CPC .... H04N 19/176; H04N 19/186; H04N 19/70; H04N 19/593; H04N 19/105;
  (Continued)

(56) References Cited

U.S. PATENT DOCUMENTS 9,565,428 B2    2/2017  Guo et al.
2017/0347128 A1  11/2017  Panusopone et al.
(Continued)

FOREIGN PATENT DOCUMENTS

CN   109417620 A   3/2019
CN   109510987 A   3/2019
(Continued)

OTHER PUBLICATIONS

Document: JVET-O0196-v3, Yin Zhao et al, CE2-related: CCLM for dual tree with 32x32 latency, Joint Video Experts Team (JVET) of ITU-T SG 16 WP 3 and ISO/IEC JTC 1/SC 29/WG 11, 15th Meeting: Gothenburg, SE, Jul. 3-12, 2019, total 9 pages.
(Continued)

*Primary Examiner* — Nathnael Aynalem
(74) *Attorney, Agent, or Firm* — WOMBLE BOND DICKINSON (US) LLP

(57) ABSTRACT

Embodiments of this application disclose an intra prediction method for a video sequence. The method includes: obtaining a size and a split mode of a chroma coding tree node; determining, based on the size and the split mode of the chroma coding tree node, whether to allow cross-component linear model (CCLM) intra prediction to be performed on a chroma coding unit included in the chroma coding tree node; determining a prediction mode of the chroma coding unit depending on whether to allow CCLM to be performed on the chroma coding unit; and processing the chroma coding unit based on the prediction mode of the chroma coding unit to obtain prediction samples of the chroma coding unit.

18 Claims, 8 Drawing Sheets

Related U.S. Application Data continuation of application No. PCT/CN2020/081672, filed on Mar. 27, 2020.

(51) Int. Cl.
*H04N 19/169* (2014.01)
*H04N 19/176* (2014.01)
*H04N 19/186* (2014.01)
*H04N 19/96* (2014.01)

(52) U.S. Cl.
CPC ....... *H04N 19/186* (2014.11); *H04N 19/1883* (2014.11); *H04N 19/96* (2014.11)

(58) Field of Classification Search
CPC ...... H04N 19/11; H04N 19/159; H04N 19/61; H04N 19/96; H04N 19/157; H04N 19/103; H04N 19/50; H04N 19/122; H04N 19/172; H04N 19/503; H04N 19/52
USPC .............................................. 375/240–240.29
See application file for complete search history.

(56) References Cited

U.S. PATENT DOCUMENTS

| | | | |
|---|---|---|---|
| 2018/0288446 | A1 | 10/2018 | An et al. |
| 2020/0014920 | A1* | 1/2020 | Zhao ................. H04N 19/146 |
| 2020/0260096 | A1* | 8/2020 | Ikai .................... H04N 19/96 |
| 2021/0385469 | A1* | 12/2021 | Deng ................. H04N 19/186 |
| 2022/0007028 | A1* | 1/2022 | Li ...................... H04N 19/186 |
| 2022/0109846 | A1 | 4/2022 | Kim et al. |
| 2022/0109848 | A1* | 4/2022 | Wang ................. H04N 19/70 |

FOREIGN PATENT DOCUMENTS

| | | |
|---|---|---|
| CN | 109691102 A | 4/2019 |
| JP | 2018056685 A | 4/2018 |
| RU | 2636680 C1 | 11/2017 |
| WO | 2016074567 A1 | 5/2016 |
| WO | 2018053293 A1 | 3/2018 |
| WO | 2018116802 A1 | 6/2018 |

OTHER PUBLICATIONS

Document: JVET-N0390, Edouard Fran ois et al, AHG16/non-CE3: Study of CCLM restrictions in case of separate luma/chroma tree, Joint Video Experts Team (JVET) of ITU-T SG 16 WP 3 and ISO/IEC JTC 1/SC 29/WG 11, 14th Meeting: Geneva, CH, Mar. 19-27, 2019, total 5 pages.
ITU-T H.223(Jul. 2001), Series H: Audiovisual and Multimedia Systems, Infrastructure of audiovisual services—Transmission multiplexing and synchronization, Multiplexing protocol for low bit rate multimedia communication, total 74 pages.
Document: JVET-N0390r1, Edouard Fran ois et al, AHG16/non-CE3: Study of CCLM restrictions in case of separate luma/chroma tree, Joint Video Experts Team (JVET) of ITU-T SG 16 WP 3 and ISO/IEC JTC 1/SC 29/WG 11, 14th Meeting: Geneva, CH, Mar. 19-27, 2019, total 7 pages.
ITU-T H.264(Apr. 2017), Series H: Audiovisual and Multimedia Systems, Infrastructure of audiovisual services-Coding of moving video, Advanced video coding for generic audiovisual services, total 812 pages.
ITU-T H.265(Feb. 2018), Series H: Audiovisual and Multimedia Systems Infrastructure of audiovisual services-Coding of moving video, High efficiency video coding, total 692 pages.
Document: JVET-M1002-v2, Jianle Chen et al., Algorithm description for Versatile Video Coding and Test Model 4 (VTM 4), Joint Video Experts Team (JVET) of ITU-T SG 16 WP 3 and ISO/IEC JTC I/SC 29/WG11, 13th Meeting: Marrakech, MA, Jan. 9-18, 2019, 62 pages, XP030203548.
Document: JVET-N0164-v3, Fangdong Chen et al., CE3-related: Size restriction for CCLM, Joint Video Experts Team (JVET) of ITU-T SG 16 WP 3 and ISO/IECJTC 1/SC 29/WGII 14th Meeting: Geneva, CH, Mar. 19-27, 2019, 6 pages, XP030203869.
Benjamin Bross et al., "Versatile Video Coding (Draft 4)",oint Video Experts Team (JVET) of ITU-T SG 16 WP 3 and ISO/IEC JTC 1/SC 29/WG 11, 13th Meeting: Marrakech, MA, 9 Jan. 18, 2019, total:286pages.
Document: JVET-N0137_r1, Tianyang Zhou et al., CE3-2.1: Intra chroma partitioning and prediction restriction, Joint Video Experts Team (JVET) of ITU-T SG 16 WP 3 and ISO/IEC JTC 1/SC 29/WG 11, 14th Meeting: Geneva, CH, Mar. 19-27, 2019, 3 pages.
Zhou Jiantong et al., Trends and technologies of video coding, Telecommunications Science, 2017, 33(8), 10 pages.
Ling Li et al., Various chroma format support in VVC, JVET-N0225-v2, Mar. 24, 2019.
Ji-Yeon Jung et al., AHG16/CE3-related: CCLM mode restriction for increasing decoder throughput, JVET-N0376-r1, Mar. 20, 2019.
Pham Van L. et al., CE3-related: Enabling parallel reconstruction of small intra-coded blocks, 14th Jvet Meeting, Joint Video Experts Team (JVET) of ITU-T SG 16 WP 3 and ISO/IEC JTC 1/SC 29/WG 11, JVET-N0396, Mar. 19, 2019- Mar. 27, 2019; Geneva.

* cited by examiner

INTRA PREDICTION METHOD AND APPARATUS FOR VIDEO SEQUENCE

CROSS-REFERENCE TO RELATED APPLICATIONS

This application is a continuation of U.S. patent application Ser. No. 17/514,289, filed on Oct. 29, 2021, which is a continuation of International Application No. PCT/CN2020/081672, filed on Mar. 27, 2020. The International Application claims priority to Chinese Patent Application No. 201910370987.9, filed on Apr. 30, 2019. All of the aforementioned patent applications are hereby incorporated by reference in their entireties.

TECHNICAL FIELD

This application relates to the field of video encoding and decoding technologies, and in particular, to an intra prediction method and apparatus for a video sequence.

BACKGROUND

In the video coding standard H.265, a frame of picture is partitioned into coding tree units (coding tree unit, CTU) that do not overlap with each other, and a size of a CTU may be set to 64×64 or another value. The CTU whose size is 64×64 is a rectangular sample matrix including 64×64 samples. The matrix sample matrix includes 64 columns, each column includes 64 samples, and each sample includes a luma component or/and a chroma component.

H.265 is based on a quadtree (quad-tree, QT) split mode in which a CTU is used as a root node of a quadtree, and the CTU is recursively split into several leaf nodes. A node corresponds to one picture region. If a node does not continue to be split, the node is referred to as a leaf node, and a picture region corresponding to the node becomes a CU. If a node continues to be split, a picture region corresponding to the node is split into four equal-sized picture regions, and each region corresponds to one node. Whether a node is to be split is determined by a split flag that is in a bitstream and that corresponds to the node. The depth of a root node is 0, and the depth of a child node is the depth of the parent node plus 1.

A CTU node whose size is 64×64 (with the depth of 0) may not be split based on a split flag corresponding to the CTU node, and become a CU whose size is 64×64, or may be split into four nodes whose sizes are 32×32 (with the depth of 1). Each of the four nodes whose sizes are 32×32 may continue to be or not be further split based on a split flag corresponding to the node. If a node whose size is 32×32 continues to be split, four nodes whose sizes are 16×16 are generated (with the depth of 2). The rest may be deduced by analogy, until no node is further split. In this case, one CTU is split into one group of CUs.

Based on a quadtree split, a binary tree (binary tree, BT) split mode and a ternary tree (ternary tree, TT) split mode are added to VTM reference software.

In addition, a split mode of cascading a QT and a BT/TT may be used in a versatile video coding test model (versatile video coding test model, VTM), and is referred to as a quadtree plus multi-type tree (quadtree plus multi-type tree, QT-BTT) mode. That is, a node in a level-1 coding tree can be split into child nodes only by using a QT mode, and a leaf node in the level-1 coding tree is a root node of a level-2 coding tree; a node in the level-2 coding tree may be split into child nodes by using one of the following four split modes: a horizontal binary split, a vertical binary split, a horizontal ternary split, and a vertical ternary split; a leaf node of the level-2 coding tree is a coding unit.

After it is learned, through parsing, that a node is a leaf node and the leaf node is a CU, coding information (including information such as a prediction mode and a transform coefficient of the CU, for example, a syntax structure coding_unit( ) in H.265) corresponding to the CU is further parsed. Then, decoding processing such as prediction, dequantization, inverse transform, and loop filtering is performed on the CU based on the coding information, so as to generate a reconstructed picture corresponding to the CU. Such a flexible coding tree structure as QT-MTT enables the CTU to be split into a group of CUs of an appropriate size based on a local feature of a picture.

A mode of splitting a CTU into a group of CUs corresponds to one coding tree. In VTM, a separation tree structure allows to be used for an intra picture (I picture). In this case, starting from a specific node A in a coding tree, a luma block of the node A is split by using a luma coding tree, and a leaf node of the luma coding tree is a luma CU, and includes only luma samples. A chroma block of the node A is split by using a chroma coding tree, and a leaf node of the chroma coding tree is a chroma CU, and includes only chroma samples.

In VTM5 (namely, VTM software version 5), a separation tree structure can be used for an intra picture. For an intra picture using a separation tree structure, a coding tree node whose size is 128×128 may be split into four nodes whose sizes are 64×64 by using a quadtree split mode, and each node whose size is 64×64 includes luma samples and chroma samples. A separation tree structure is used for a node whose size is 64×64, that is, a luma block of a node whose size is 64×64 is split by using a luma coding tree, and a chroma block of the node whose size is 64×64 is split by using a chroma coding tree. A split mode used for the luma coding tree may be different from a split mode used for the chroma coding tree. For example, a luma block of a node whose size is 64×64 may be split by using a quadtree split mode, and a chroma block may be split by using a horizontal binary split mode. In a YUV4:2:0 format, because horizontal and vertical sampling rates of chroma are half of those of chroma, a node whose size is M×N corresponds to (M/2)×(N/2) chroma samples.

However, when a separation tree structure is used for an intra picture, a comparatively long chroma processing latency may be caused, reducing a throughput of a hardware decoder.

SUMMARY

Embodiments of this application provide an intra prediction method and apparatus for a video sequence. The embodiments of this application helps reduce a chroma processing latency and improve a throughput of a hardware decoder. The video sequence (video sequence) includes one or more pictures (picture).

For brevity of description, a size and a shape of a node in the embodiments of the present disclosure are a size and a shape of a picture region corresponding to the node. In the embodiments of the present disclosure, both a width and a height of a node are represented by a quantity of luma samples corresponding to the node.

According to a first aspect, an embodiment of the present disclosure provides an intra prediction method for a video sequence, including:

obtaining a size and a split mode of a chroma coding tree node; determining, based on the size and the split mode of the chroma coding tree node, whether to allow cross-component linear model (CCLM) intra prediction to be performed on a chroma coding unit included in the chroma coding tree node; determining a prediction mode of the chroma coding unit depending on whether to allow CCLM to be performed on the chroma coding unit; and processing the chroma coding unit based on the prediction mode of the chroma coding unit to obtain prediction samples of the chroma coding unit. Whether to allow CCLM to be performed on the chroma coding unit included in the chroma coding tree node is determined based on the size and the split mode of the chroma coding tree node, thereby reducing a latency in processing a chroma coding unit on which CCLM is performed, and improving a throughput of a hardware decoder.

In an embodiment, the size of the chroma coding tree node is M×N, and the determining, based on the size and the split mode of the chroma coding tree node, whether to allow CCLM to be performed on a chroma coding unit included in the chroma coding tree node includes:

when both M and N are equal to a preset threshold T1, if the split mode of the chroma coding tree node meets a first preset condition, determining to allow CCLM to be performed on the chroma coding unit; or if the split mode of the chroma coding tree node does not meet a first preset condition, determining not to allow CCLM to be performed on the chroma coding unit, where the first preset condition includes no splitting or a quadtree split mode.

In an embodiment, the size of the chroma coding tree node is M×N, and the determining, based on the size and the split mode of the chroma coding tree node, whether to allow CCLM to be performed on a chroma coding unit included in the chroma coding tree node includes:

when M is equal to T1 and N is equal to T1/2, if the split mode of the chroma coding tree node meets a second preset condition, determining to allow CCLM to be performed on the chroma coding unit; or if the split mode of the chroma coding tree node does not meet a second preset condition, determining not to allow CCLM to be performed on the chroma coding unit, where the second preset condition includes no splitting or a vertical binary split mode.

In an embodiment, the determining, based on the size and the split mode of the chroma coding tree node, whether to allow CCLM to be performed on a chroma coding unit included in the chroma coding tree node includes:

determining, based on the size and the split mode of the chroma coding tree node, a split mode of a luma coding tree node corresponding to the chroma coding tree node, and whether to allow an intra sub-partition ISP mode to be used for a corresponding luma block when a luma coding tree node is not split, whether to allow CCLM to be performed on the chroma coding unit included in the chroma coding tree node.

In an embodiment, the size of the chroma coding tree node is M×N, and the determining, based on the size and the split mode of the chroma coding tree node and a split mode of a luma coding tree node corresponding to the chroma coding tree node, whether to allow CCLM to be performed on the chroma coding unit included in the chroma coding tree node includes:

when the split mode of the chroma coding tree node meets a third preset condition, determining not to allow CCLM to be performed on the chroma coding unit; or when the split mode of the chroma coding tree node does not meet the third preset condition, M is equal to a T1, and N is equal to T1, if the split mode of the chroma coding tree node meets a first preset condition, determining to allow CCLM to be performed on the chroma coding unit; or if the split mode of the chroma coding tree node does not meet a first preset condition, determining not to allow CCLM to be performed on the chroma coding unit, where the first preset condition includes no splitting or a quadtree split mode.

In an embodiment, the size of the chroma coding tree node is M×N, and the determining, based on the size and the split mode of the chroma coding tree node, a split mode of a luma coding tree node corresponding to the chroma coding tree node, and whether to allow an intra sub-partition ISP mode to be used for a corresponding luma block when a luma coding tree node is not split, whether to allow CCLM to be performed on the chroma coding unit included in the chroma coding tree node include:

when the split mode of the chroma coding tree node meets any one condition in a third preset condition, determining not to allow CCLM to be performed on the chroma coding unit; or when the split mode of the chroma coding tree node does not meet a third preset condition, N=T1, and M=T1/2, if the split mode of the chroma coding tree node meets a second preset condition, determining to allow CCLM to be performed on the chroma coding unit; or if the split mode of the chroma coding tree node does not meet a second preset condition, determining not to allow CCLM to be performed on the chroma coding unit, where the second preset condition includes no splitting or a vertical binary split mode.

In an embodiment, the third preset condition includes one or any combination of the following condition 1 to condition 13, and condition 1 to condition 13 are as follows:

Condition 1: The split mode of the luma coding tree node corresponding to the chroma coding tree node is no splitting, and an ISP mode is used for a luma block of the luma coding tree node, where a size of the luma coding tree node is T1×T1.

Condition 2: The split mode of the luma coding tree node corresponding to the chroma coding tree node is no splitting, an ISP mode is used for a luma block of the luma coding tree node, and the chroma coding tree node is split into child nodes, where the size of the chroma coding tree node, a size of the luma coding tree node, and a size of the luma block are all T1×T1.

Condition 3: The split mode of the luma coding tree node corresponding to the chroma coding tree node is no splitting, a horizontal ISP mode is used for a luma block of the luma coding tree node, and the chroma coding tree node is split into child nodes by using one of a vertical binary split mode, a vertical ternary split mode, or a quadtree split mode, where the size of the chroma coding tree node, a size of the luma coding tree node, and a size of the luma block are all T1×T1.

Condition 4: The split mode of the luma coding tree node corresponding to the chroma coding tree node is no splitting, a horizontal ISP mode is used for a luma block of the luma coding tree node, and the chroma coding tree node is split into child nodes by using one of a horizontal ternary split mode, a vertical binary split mode, a vertical ternary split mode, or a quadtree split mode, where the size of the chroma coding tree node, a size of the luma coding tree node, and a size of the luma block are all T1×T1.

Condition 5: The split mode of the luma coding tree node corresponding to the chroma coding tree node is no splitting, a horizontal ISP mode is used for a luma block of the luma coding tree node, and the chroma coding tree node is split into child nodes by using one of a vertical binary split mode, a vertical ternary split mode, or a horizontal ternary split mode, where a size of the luma coding tree node is T1×T1, and the size of the chroma coding tree node is T1×(T1/2).

Condition 6: The split mode of the luma coding tree node corresponding to the chroma coding tree node is no splitting, a vertical ISP mode is used for a luma block of the luma coding tree node, and the chroma coding tree node is split into child nodes by using one of a horizontal binary split mode, a horizontal ternary split mode, or a quadtree split mode, where both the size of the chroma coding tree node and a size of the luma coding tree node are T1×T1.

Condition 7: The split mode of the luma coding tree node corresponding to the chroma coding tree node is no splitting, a vertical ISP prediction mode is used for a luma block of the luma coding tree node, and the chroma coding tree node is split into child nodes by using one of a vertical ternary split mode, a horizontal binary split mode, a horizontal ternary split mode, or a quadtree split mode, where the size of the chroma coding tree node, a size of the luma coding tree node, and a size of the luma block are all T1×T1.

Condition 8: The split mode of the luma coding tree node corresponding to the chroma coding tree node is no splitting, a vertical ISP mode is used for a luma block of the luma coding tree node, and the chroma coding tree node is split into child nodes by using one of a horizontal binary split mode, a horizontal ternary split mode, or a vertical ternary split mode, where a size of the luma coding tree node and a size of the luma block are both T1×T1, and the size of the chroma coding tree node is T1×(T1/2).

Condition 9: The luma coding tree node corresponding to the chroma coding tree node is split into child nodes by using a horizontal binary split mode, where a size of the luma coding tree node is T1×T1.

Condition 10: The luma coding tree node corresponding to the chroma coding tree node is split into child nodes by using a vertical binary split mode, where a size of the luma coding tree node is T1×T1.

Condition 11: The luma coding tree node corresponding to the chroma coding tree node is split into child nodes by using a horizontal ternary split mode, where a size of the luma coding tree node is T1×T1.

Condition 12: The luma coding tree node corresponding to the chroma coding tree node is split into child nodes by using a vertical ternary split mode, where a size of the luma coding tree node is T1×T1.

Condition 13: The split mode used for the luma coding tree node corresponding to the chroma coding tree node is split mode other than no splitting and a quadtree split, where a size of the luma coding tree node is T1×T1.

It should be noted herein that, that the chroma coding tree node is split into child nodes means that the chroma coding tree node is split into child nodes by using one of the horizontal binary split mode, the vertical binary split mode, the horizontal ternary split mode, the vertical ternary split mode, and the quadtree split mode.

In an embodiment, the third preset condition includes:
The split mode of the luma coding tree node corresponding to the chroma coding tree node is no splitting, and an ISP prediction mode is used for a luma block of the luma coding tree node, where a size of the luma coding tree node and a size of the luma block are both T1×T1.

In an embodiment, the third preset condition includes:
The split mode of the luma coding tree node corresponding to the chroma coding tree node is no splitting, an ISP mode is used for a luma block of the luma coding tree node, and the chroma coding tree node is split into child nodes, where the size of the chroma coding tree node, a size of the luma coding tree node, and a size of the luma block are all T1×T1.

In an embodiment, the third preset condition includes condition 1 and condition 13.

In an embodiment, the third preset condition includes condition 2 and condition 13.

In an embodiment, the third preset condition includes:
The split mode of the luma coding tree node corresponding to the chroma coding tree node is no splitting, an ISP mode is used for a luma block of the luma coding tree node, and the chroma coding tree node is split into child nodes; or the split mode of the luma coding tree node is one of a horizontal binary split mode and a vertical binary split mode, where the size of the chroma coding tree node, a size of the luma coding tree node, and a size of the luma block are all T1×T1.

In an embodiment, the third preset condition includes condition 3, condition 5, condition 6, condition 8, and condition 13.

In an embodiment, the third preset condition includes condition 4, condition 5, condition 7, condition 8, and condition 13.

In an embodiment, the third preset condition includes condition 3, condition 5, condition 7, condition 8, condition 9, condition 10, condition 11, and condition 12.

In an embodiment, the preset threshold T1 is equal to 64.

According to a second aspect, an embodiment of the present disclosure provides an intra prediction method for a video sequence, including:
parsing a bitstream to obtain a first identifier and a second identifier, where the first identifier is used to indicate whether a separation tree structure is used for an intra picture in the video sequence, and the second identifier is used to indicate whether to allow CCLM to be performed on a chroma block in the video sequence; and
if the first identifier indicates that the separation tree structure is used for the intra picture in the video sequence, and the second identifier indicates allowing CCLM to be performed on the chroma block in the video sequence, performing the intra prediction method for the video sequence described in any one of the first aspect and the embodiments of the first aspect.

According to a third aspect, an embodiment of the present disclosure provides an intra prediction apparatus for a video sequence, including:
an obtaining unit, configured to obtain a size and a split mode of a chroma coding tree node;
a determining unit, configured to determine, based on the size and the split mode of the chroma coding tree node, whether to allow CCLM to be performed on a chroma coding unit included in the chroma coding tree node; and determine a prediction mode of the chroma coding unit depending on whether to allow CCLM to be performed on the chroma coding unit; and a prediction unit, configured to process the chroma coding unit based on the prediction mode of the chroma coding unit to obtain prediction samples of the chroma coding unit.

In an embodiment, the size of the chroma coding tree node is M×N, and in an aspect of the determining, based on the size and the split mode of the chroma coding tree node, whether to allow CCLM to be performed on a chroma coding unit included in the chroma coding tree node, the determining unit is configured to:

when both M and N are equal to a preset threshold T1, if the split mode of the chroma coding tree node meets a first preset condition, determine to allow CCLM to be performed on the chroma coding unit; or if the split mode of the chroma coding tree node does not meet a first preset condition, determine not to allow CCLM to be performed on the chroma coding unit, where the first preset condition includes no splitting or a quadtree split mode.

In an embodiment, the size of the chroma coding tree node is M×N, and in an aspect of the determining, based on the size and the split mode of the chroma coding tree node, whether to allow CCLM to be performed on a chroma coding unit included in the chroma coding tree node, the determining unit is configured to:

when M is equal to a T1 and N is equal to T1/2, if the split mode of the chroma coding tree node meets a second preset condition, determine to allow CCLM to be performed on the chroma coding unit; or if the split mode of the chroma coding tree node does not meet a second preset condition, determine not to allow CCLM to be performed on the chroma coding unit, where the second preset condition includes no splitting or a vertical binary split mode.

In an embodiment, in an aspect of the determining, based on the size and the split mode of the chroma coding tree node, whether to allow cross-component linear model (CCLM) intra prediction to be performed on a chroma coding unit included in the chroma coding tree node, the determining unit is configured to:

determine, based on the size and the split mode of the chroma coding tree node, a split mode of a luma coding tree node corresponding to the chroma coding tree node, and whether to allow an ISP mode to be used for a corresponding luma block when a luma coding tree node is not split, whether to allow CCLM to be performed on the chroma coding unit included in the chroma coding tree node.

In an embodiment, the size of the chroma coding tree node is M×N, and in an aspect of the determining, based on the size and the split mode of the chroma coding tree node, a split mode of a luma coding tree node corresponding to the chroma coding tree node, and whether to allow an intra sub-partition ISP mode to be used for a corresponding luma block when a luma coding tree node is not split, whether to allow CCLM to be performed on the chroma coding unit included in the chroma coding tree node, the determining unit is configured to:

when the split mode of the chroma coding tree node meets a third preset condition, determine not to allow CCLM to be performed on the chroma coding unit; or when the split mode of the chroma coding tree node does not meet a third preset condition, M is equal to a T1, and N is equal to T1, if the split mode of the chroma coding tree node meets a first preset condition, determine to allow CCLM to be performed on the chroma coding unit; or if the split mode of the chroma coding tree node does not meet a first preset condition, determine not to allow CCLM to be performed on the chroma coding unit, where the first preset condition includes no splitting or a quadtree split mode.

In an embodiment, the size of the chroma coding tree node is M×N, and in an aspect of the determining, based on the size and the split mode of the chroma coding tree node, a split mode of a luma coding tree node corresponding to the chroma coding tree node, and whether to allow an intra sub-partition ISP mode to be used for a corresponding luma block when a luma coding tree node is not split, whether to allow CCLM to be performed on the chroma coding unit included in the chroma coding tree node, the determining unit is configured to:

when the split mode of the chroma coding tree node meets any one condition in a third preset condition, determine not to allow CCLM to be performed on the chroma coding unit; or when the split mode of the chroma coding tree node does not meet a third preset condition, N=T1, and M=T1/2, if the split mode of the chroma coding tree node meets a second preset condition, determine to allow CCLM to be performed on the chroma coding unit; or if the split mode of the chroma coding tree node does not meet a second preset condition, determine not to allow CCLM to be performed on the chroma coding unit, where the second preset condition includes no splitting or a vertical binary split mode.

In an embodiment, the third preset condition includes one or more of condition 1, condition 2, condition 3, condition 4, condition 5, condition 6, condition 7, condition 8, condition 9, condition 10, condition 11, condition 12, and condition 13 in the first aspect.

In an embodiment, the third preset condition includes:
The split mode of the luma coding tree node corresponding to the chroma coding tree node is no splitting, and an ISP prediction mode is used for a luma block of the luma coding tree node, where a size of the luma coding tree node and a size of the luma block are both T1×T1.

In an embodiment, the third preset condition includes:
The split mode of the luma coding tree node corresponding to the chroma coding tree node is no splitting, an ISP mode is used for a luma block of the luma coding tree node, and the chroma coding tree node is split into child nodes, where the size of the chroma coding tree node, a size of the luma coding tree node, and a size of the luma block are all T1×T1.

In an embodiment, the third preset condition includes condition 1 and condition 13 in the first aspect.

In an embodiment, the third preset condition includes condition 2 and condition 13 in the first aspect.

In an embodiment, the third preset condition includes:
The split mode of the luma coding tree node corresponding to the chroma coding tree node is no splitting, an ISP mode is used for a luma block of the luma coding tree node, and the chroma coding tree node is split into child nodes; or the split mode of the luma coding tree node is one of a horizontal binary split mode and a vertical binary split mode, where the size of the chroma coding tree node, a size of the luma coding tree node, and a size of the luma block are all T1×T1.

In an embodiment, the third preset condition includes condition 3, condition 5, condition 6, condition 8, and condition 13 in the first aspect.

In an embodiment, the third preset condition includes condition 4, condition 5, condition 7, condition 8, and condition 13 in the first aspect.

In an embodiment, the third preset condition includes condition 3, condition 5, condition 7, condition 8, condition 9, condition 10, condition 11, and condition 12 in the first aspect.

In an embodiment, the preset threshold T1 is equal to 64.

According to a fourth aspect, an embodiment of the present disclosure provides an intra prediction apparatus for a video sequence, including:

- a decoding unit, configured to parse a bitstream to obtain a first identifier and a second identifier, where the first identifier is used to indicate whether a separation tree structure is used for an intra picture in the video sequence, and the second identifier is used to indicate whether to allow CCLM to be performed on a chroma block in the video sequence; and
- a prediction unit, configured to: if the first identifier indicates that the separation tree structure is used for the intra picture in the video sequence, and the second identifier indicates allowing CCLM to be performed on the chroma block in the video sequence, perform all or a part of the intra prediction method for the video sequence in the first aspect.

According to a fifth aspect, an embodiment of the present disclosure provides a decoding device, including a nonvolatile memory and a processor that are coupled to each other, where the processor invokes program code stored in the memory, to perform some or all of operations in the method in either the first aspect or the second aspect.

According to a sixth aspect, an embodiment of the present disclosure provides a computer-readable storage medium. The computer-readable storage medium stores program code, and the program code includes instructions for performing some or all of the operations in the method in either the first aspect or the second aspect.

It should be understood that technical solutions of the second to the sixth aspects of this application are consistent with technical solutions of the first aspect of the present disclosure, and beneficial effects achieved by the aspects and corresponding implementations are similar. Details are not described again.

BRIEF DESCRIPTION OF DRAWINGS

To describe the technical solutions in the embodiments of the present disclosure or in the prior art more clearly, the following briefly describes the accompanying drawings for describing the embodiments or the prior art. It is clear that the accompanying drawings in the following descriptions show merely some embodiments of the present disclosure, and a person of ordinary skill in the art may derive other drawings from these accompanying drawings without creative efforts.

DESCRIPTION OF EMBODIMENTS

The following describes the embodiments of this application with reference to accompanying drawings.

Terms in the present disclosure are first described herein.

Coding tree unit (CTU): A picture includes a plurality of CTUs, and one CTU usually corresponds to one square picture region, and includes luma samples and chroma samples in the picture region (or may include only luma samples, or may include only chroma samples). The CTU further includes syntax elements. These syntax elements indicate a method about how to split the CTU into at least one coding unit (CU) and decode each coding unit to obtain a reconstructed picture.

CU: A CU usually corresponds to an A×B rectangular region and includes A×B luma samples and chroma samples corresponding to the luma samples, where A is the width of the rectangle, B is the height of the rectangle, and A may be the same as or different from B. Values of A and B are usually integer powers of 2, for example, 256, 128, 64, 32, 16, 8, and 4. A coding unit may be decoded to obtain a reconstructed picture of an A×B rectangular region. The decoding processing usually includes performing processing such as prediction, dequantization, and inverse transformation, to generate a prediction picture and a residual. A reconstructed picture is obtained by superimposing the prediction picture and the residual.

Figure 1:
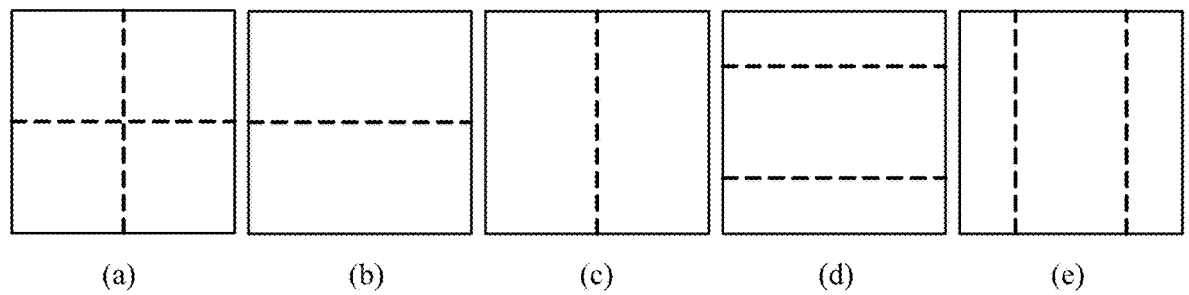
FIG. 1 is a schematic diagram of a CTU split mode.

Quadtree: The quadtree is a tree-shaped structure, and a node can be split into four child nodes. A quadtree-based CTU split mode is used in the video coding standard H.265: A CTU is used as a root node, and each node corresponds to one square region. A node may not be further split (in this case, a region corresponding to the node is a CU), or a node is split into four lower-level nodes, that is, a square region is split into four equal-sized square regions (where the length and the width of each of the four equal-sized square regions are half of the length and the width of the square region that is before split), and each region corresponds to one node, as shown in (a) of FIG. 1.

Binary tree: The binary tree is a tree-shaped structure, and a node can be split into two child nodes. In an existing coding method in which a binary tree is used, a node in a binary tree structure may not be split, or the node is split into two lower-level nodes. The node is split into two nodes in any one of two manners: (1) a horizontal binary split: A region corresponding to the node is split into two equal-sized regions: an upper region and a lower region, and each region corresponds to one node, as shown in (b) of FIG. 1; or (2) a vertical binary split: A region corresponding to the node is split into two equal-sized regions: a left region and a right region, and each region corresponds to one node, as shown in (c) of FIG. 1.

Ternary tree: The ternary tree is a tree-shaped structure, and a node can be split into three child nodes. In an existing ternary-tree-based coding method, a node on a ternary tree structure may not be split, or the node may be split into three lower-level nodes. The node is split into three nodes in any one of two manners: (1) a horizontal ternary split: a region corresponding to the node is split into three regions: an upper region, a middle region, and a lower region, and each region corresponds to one node, where heights of the upper region, the middle region, and the lower region are ¼, ½, and ¼ of the height of the node, respectively, as shown in (d) of FIG. 1; (2) a vertical ternary split: A region corresponding to the node is split into three regions: a left region, a middle region, and a right region, and each region corresponds to one node, where widths of the left region, the middle region, and the right region are ¼, ½, and ¼ of the height of the node, respectively, as shown in (f) of FIG. 1.

Versatile video coding test model (VTM): is codec reference software for the H.266/versatile video coding (VVC) standard organized and developed by JVET.

Cross-component linear model intra prediction (CCLM): is a method of predicting chroma by using a luma reconstruction sample, for example, a CCLM technology in VTM5. In CCLM, linear model parameters α and β are estimated by using a reconstructed luma sample and a reconstructed chroma sample around a current chroma block; after the reconstructed luma samples corresponding to the current chroma block are downsampled, prediction samples of the current chroma block are obtained by using a linear model, as shown in Formula 1:

$$\text{pred}_C(i,j) = \alpha * \text{rec}'_L(i,j) + \beta \quad (1)$$

α and β are linear model coefficients, $\text{pred}_C(i, j)$ is a predictor of a chroma sample in a position (i, j), and $\text{rec}'_L(i, j)$ represent luma reconstruction sample values in a position (i, j) after a luma reconstruction block corresponding to the current chroma block is downsampled to chroma component resolution. It should be noted that, for a video in a YUV4:2:0 format, resolution of a luma component is four times (twice the width and twice the height) resolution of a chroma component. To obtain a luma block with same resolution as a chroma block, a luma component needs to be downsampled to chroma resolution according to a same downsampling method as the chroma component, and then is used.

Intra sub-partition (ISP) is an intra prediction technology based on a sub-block split, for example, an ISP technology in VTM5. When an ISP mode is used, a luma block is horizontally or vertically split into a plurality of (for example, two or four) equal-sized luma sub-blocks, and the luma sub-block are decoded and reconstructed sequentially. If a common intra prediction mode (for example, an angular prediction mode, a planar prediction mode, or a direct current prediction mode) is used for a chroma block, only reconstructed samples around a chroma block are used for intra prediction of the chroma block. In this case, intra prediction of the chroma block and intra prediction of the luma block may be performed concurrently, a maximum latency for performing prediction processing on a chroma block relative to performing prediction processing on a luma block in a corresponding region (which is a chroma processing latency for short) is a processing time for performing intra prediction and reconstruction on a region including 0 luma samples. In a single tree, a CU includes luma samples and chroma samples. When CCLM is performed on the chroma sample, a luma reconstruction sample in a corresponding position needs to be used. If a luma block is split into a plurality of sub-regions for sequential processing, after intra prediction is performed on a luma sub-region, predictors and residuals are superimposed to obtain reconstructed samples of the luma sub-region, and CCLM prediction may be performed on a chroma sub-region in the corresponding position by using the reconstructed samples of the luma sub-region. Therefore, when a separation tree structure is used for an intra picture, if CCLM prediction is performed on a chroma block, a problem of a comparatively long chroma processing latency may be caused.

Figure 2:
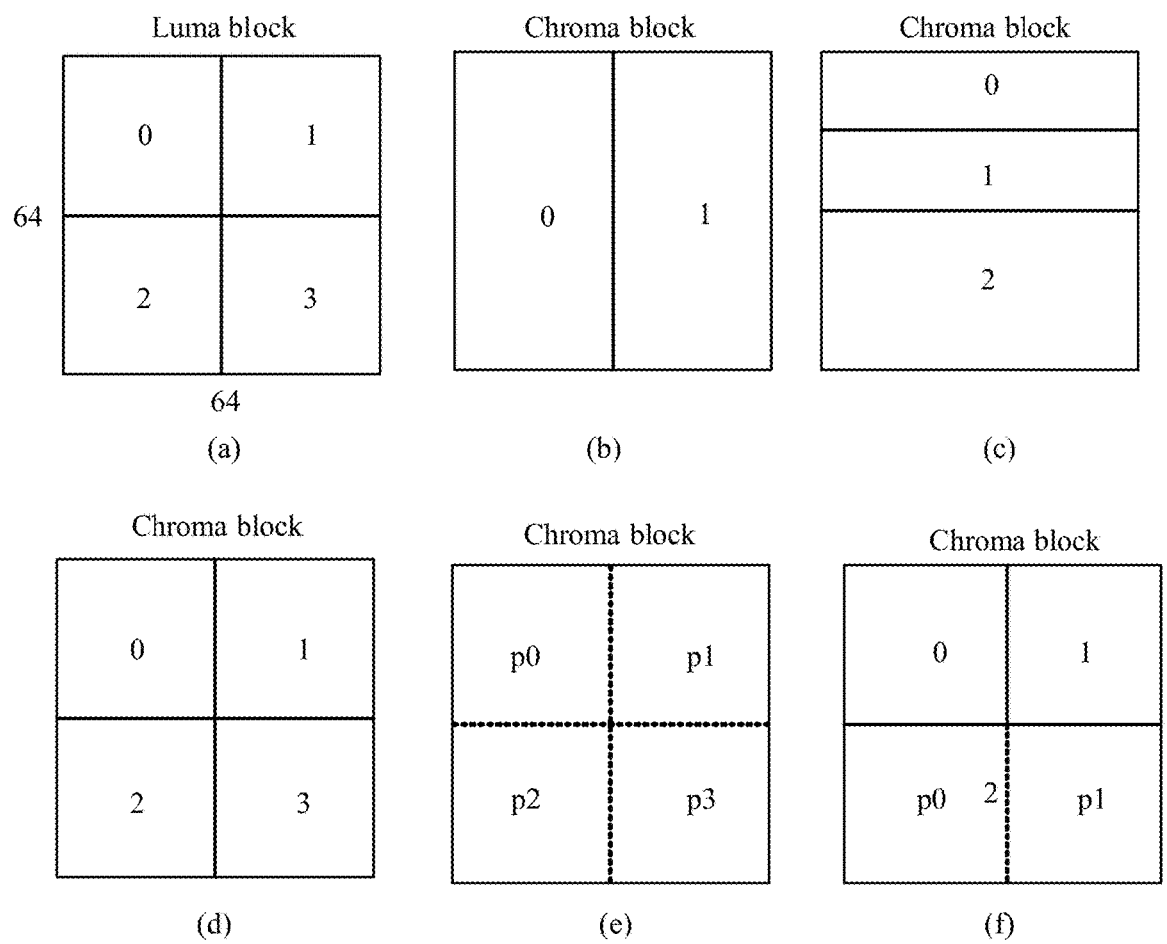
FIG. 2 is a schematic diagram of a split mode of a chroma block and a luma block.

For example, when a luma block of a node whose size is 64×64 is split by using a quadtree split mode (as shown in (a) of FIG. 2), a processing sequence of four generated luma nodes is a node 0, a node 1, a node 2, and a node 3. When a chroma block of the node whose size is 64×64 is split, by using a vertical binary split mode shown in (b) of FIG. 2, to generate two chroma nodes, if CCLM prediction is performed on a chroma node 0, luma reconstruction sample values required for CCLM prediction can be obtained for the chroma node 0 only after the luma node 2 is reconstructed. A chroma processing latency is a processing time of three luma regions whose sizes are 32×32 (that is, 3072 luma samples). For another example, when a chroma block of the node whose size is 64×64 is split into two chroma nodes by using a horizontal binary tree shown in (c) of FIG. 2, and a chroma block of a node whose size is 64×32 on the upper side continues to be further split into two nodes by using a horizontal binary tree mode, if CCLM prediction is performed on a chroma node 0, all luma reconstruction sample values required for CCLM prediction can be obtained for the chroma node 0 only after the luma node 1 is reconstructed, and a chroma processing latency is a processing time of two luma regions (that is, 2048 luma samples) whose sizes are 32×32.

When some splits are performed on a chroma block of a node whose size is 64×64, a processing latency for performing CCLM on a chroma node does not exceed a processing time of one luma region whose size is 32×32. For example, when a luma block whose size is 64×64 is split by using a quadtree split mode, if a corresponding chroma block is also split by using a quadtree split mode, as shown in (d) of FIG. 2, CCLM can be performed on a chroma node 0 after a luma node 0 is reconstructed, CCLM can be performed on a chroma node 1 after a luma node 1 is reconstructed, and so on. For another example, if a chroma block of a node whose size is 64×64 is not split, as shown in (e) of FIG. 2, the chroma block may be split into four regions p0, p1, p2, and p3 for sequential intra prediction, CCLM can be performed on the chroma region p0 after a luma node 0 is reconstructed, CCLM can be performed on the chroma region p1 after a luma node 1 is reconstructed, and so on. For another example, if a chroma block of a node whose size is 64×64 is first split by using a horizontal split mode, a chroma node whose size is 64×32 on the upper side is split by using a vertical split mode, and a chroma node whose size is 64×32 on the lower side is not split, as shown in (f) of FIG. 2, chroma processing latencies of chroma nodes 0, 1, and 2 all are a latency in processing a luma region whose size is 32×32. This is because CCLM can be performed on the chroma node 0 after a luma node 0 is reconstructed, CCLM can be performed on the chroma node 2 after a luma node 1 is reconstructed, CCLM can be performed on a region p0 of the chroma node 2 after a luma node 2 is completed, and CCLM can be performed on a region p1 of a chroma node 2 after a luma node 3 is reconstructed.

Figure 3:
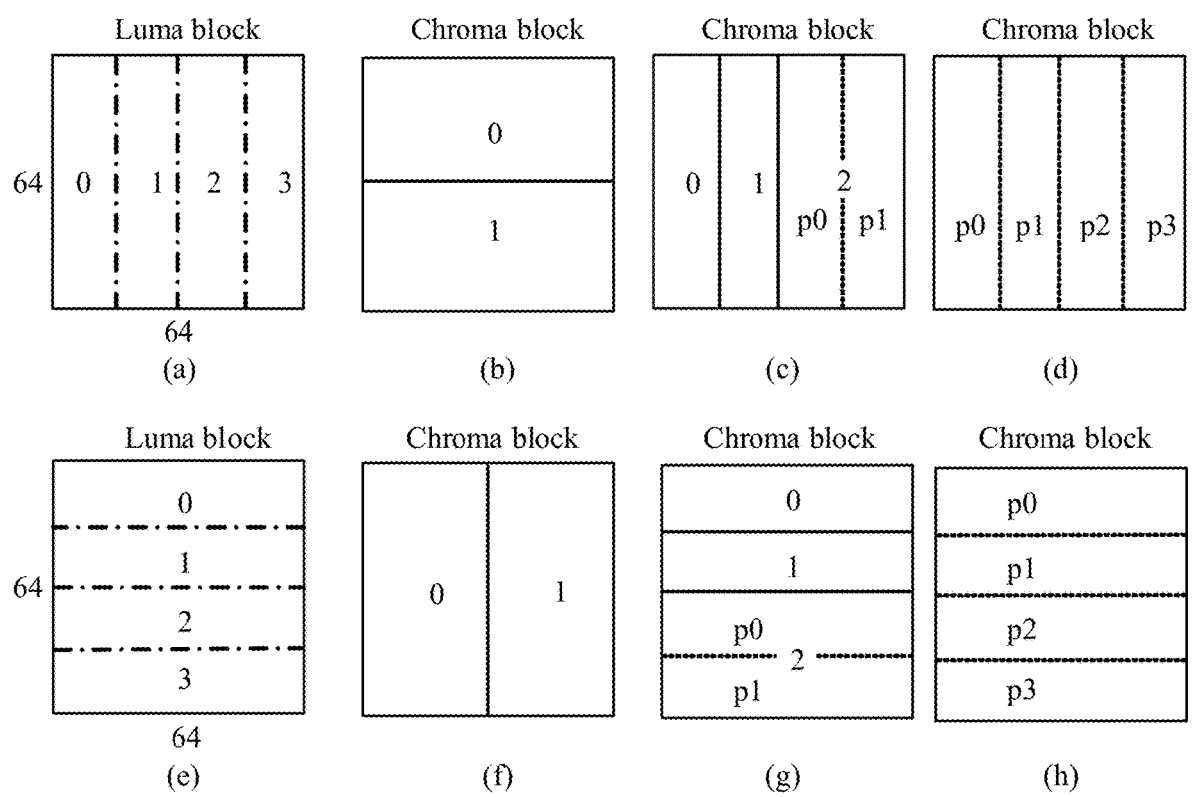
FIG. 3 is a schematic diagram of another split mode of a chroma block and a luma block.

In addition, if a separation tree structure is used for an intra picture, when a luma block whose size is 64×64 is not split and an ISP mode is used for the luma block, a chroma processing latency may exceed a processing time of one luma region whose size is 32×32. For example, when a luma block of a node whose size is 64×64 is split into four luma sub-blocks by using a vertical ISP mode, as shown in (a) of FIG. 3, if a chroma block of the node whose size is 64×64 is split by using a horizontal binary split mode, as shown in (b) of FIG. 3, CCLM can be performed on a chroma node 0 only after four luma sub-blocks are reconstructed, and a chroma processing latency is a processing time of four luma regions whose sizes are 32×32. Similarly, when a luma block of a node whose size is 64×64 is split into four luma sub-blocks by using a horizontal ISP mode, as shown in (e) of FIG. 3, if a chroma block of the node whose size is 64×64 is split by using a vertical binary split mode, as shown in (f) of FIG. 3, CCLM can be performed on a chroma node 0 only after four luma sub-blocks are reconstructed, and a chroma processing latency is a processing time of four luma regions whose sizes are 32×32.

When some splits are performed on a chroma block of a node whose size is 64×64, even if a luma block whose size is 64×64 is not split and an ISP mode is used for the luma block, a processing latency for performing CCLM by the chroma node does not exceed a processing time of one luma region whose size is 32×32. For example, when a vertical ISP mode is used for a luma block of a node whose size is 64×64, if a chroma block of the node whose size is 64×64 is not split, as shown in (d) of FIG. 3, or a chroma block of the node whose size is 64×64 is split by using a vertical binary mode to obtain nodes whose sizes are 32×64 and the nodes are split by using a vertical binary split mode or are not split, as shown in (c) of FIG. 3, a chroma processing latency is a processing time of one luma region whose size is 16×64, and may also be considered as being approximately equal to a processing time of one 32×32 luma region (both correspond to 1024 luma samples). More specifically, when the chroma block of the node whose size is 64×64 is not split, the chroma block may be vertically split into four sub-regions, and CCLM can start to be performed on each sub-region after a corresponding luma sub-block whose size is 16×64 is reconstructed. If the chroma block of the node whose size is 64×64 is split by using a vertical binary mode to obtain nodes whose sizes are 32×64 and the nodes are split by using a vertical binary split mode, CCLM can start to be performed on each chroma node whose size is 16×64 after a corresponding luma sub-block whose size is 16×64 is reconstructed. When a node whose size is 32×64 is not horizontally split, the node may be vertically split into two sub-regions whose size is 16×64, and CCLM can start to be performed on each sub-region after a corresponding luma sub-block whose size is 16×64 is reconstructed. Similarly, when a horizontal ISP mode is used for a luma block of a node whose size is 64×64, if a chroma block of the node whose size is 64×64 is not split, as shown in (h) of FIG. 3, or a chroma block of the node whose size is 64×64 is split by using a horizontal binary split mode to obtain nodes whose sizes are 64×32 and the nodes are split by using a horizontal binary split mode or are not split, as shown in (g) of FIG. 3, a chroma processing latency is a processing time of one luma region whose size is 64×16, and is equal to a processing time of one luma region whose size is 32×32.

Figure 4:
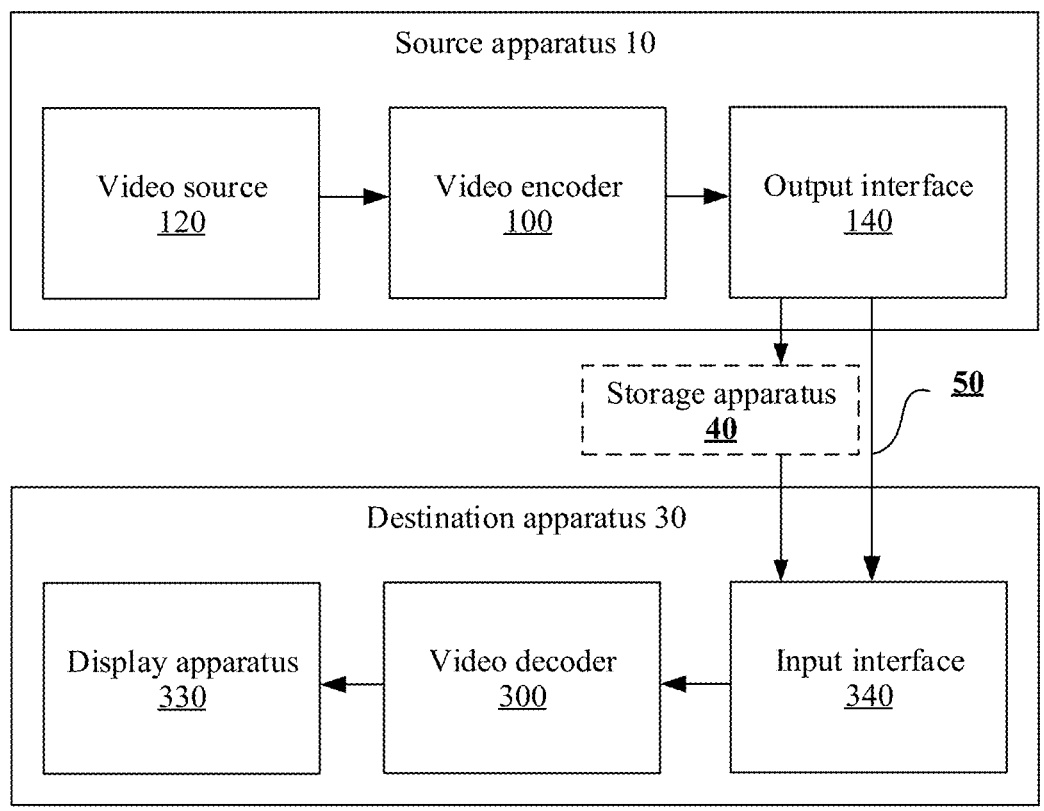
FIG. 4 is a schematic block diagram of a video encoding and decoding system according to an embodiment of the present disclosure.

FIG. 4 is a block diagram of an example of a video coding system 4 described in an embodiment of this application. As used in this specification, a term "video codec" usually refers to a video encoder and a video decoder. In this application, a term "video coding" or "coding" may usually refer to video encoding or video decoding. A video encoder 100 and a video decoder 300 in the video coding system 1 are configured to predict motion information, for example, a motion vector, of a current coded picture block or a sub-block of a current coded picture block by using various method examples described in any one of a plurality of new inter prediction modes provided in this application, so that a prediction motion vector is maximally close to a motion vector obtained by using a motion estimation method. In this way, a motion vector difference does not need to be transmitted during encoding, thereby further improving encoding and decoding performance.

As shown in FIG. 4, a video coding system 1 includes a source apparatus 10 and a destination apparatus 30. The source apparatus 10 generates encoded video data. Therefore, the source apparatus 10 may be referred to as a video encoding apparatus. The destination apparatus 30 can decode the encoded video data generated by the source apparatus 10. Therefore, the source apparatus 30 may be referred to as a video intra prediction apparatus. The source apparatus 10, the destination apparatus 30 or various implementation solutions of the source apparatus 10 and the destination apparatus 20 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification.

The source apparatus 10 and the destination apparatus 30 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, or a similar apparatus.

The destination apparatus 30 may receive the encoded video data from the source apparatus 10 through a link 50. The link 50 may include one or more media or apparatuses that can transfer the encoded video data from the source apparatus 10 to the destination apparatus 30. In an example, the link 50 may include one or more communications media that enable the source apparatus 10 to directly send the encoded video data to the destination apparatus 30 in real time. In this example, the source apparatus 10 may modulate the encoded video data according to a communications standard (for example, a wireless communications protocol), and may send modulated video data to the destination apparatus 30. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 30.

In another example, the encoded data may be output to a storage apparatus 40 through an output interface 140. Similarly, the encoded video data may be accessed from the storage apparatus 40 through an input interface 340. The storage apparatus 40 may include any one of a plurality of distributed or locally accessed data storage media, for example, a hard disk drive, a Blu-ray disc, a DVD, a CD-ROM, a flash memory, a volatile or nonvolatile memory, or any other suitable digital storage medium configured to store encoded video data.

In another example, the storage apparatus 40 may correspond to a file server or another intermediate storage apparatus that can maintain an encoded video generated by the source apparatus 10. The destination apparatus 30 may access the stored video data from the storage apparatus 40 through streaming transmission or downloading. A file server may be any type of server that can store the encoded video data and that sends the encoded video data to the destination apparatus 30. For example, the file server may be a network server (for example, used for a website), an FTP server, a network-attached storage (NAS) apparatus, or a local disk drive. The destination apparatus 30 may access the encoded video data through any standard data connection (including an internet connection). The standard data connection may include a wireless channel (for example, a Wi-Fi connection), a wired connection (for example, a DSL or a cable modem), or a combination thereof that is suitable for accessing the encoded video data stored in the file server. Transmission of the encoded video data from the storage apparatus 40 may be streaming transmission, downloading transmission, or a combination thereof.

A motion vector prediction technology in this application may be used for video encoding and decoding, to support a plurality of multimedia applications, for example, over-the-air television broadcast, cable television transmission, satellite television transmission, streaming video transmission (for example, over the internet), encoding of video data stored in a data storage medium, decoding of video data stored in a data storage medium, or other applications. In some examples, the video coding system 1 may be configured to support unidirectional or bidirectional video transmission, to support applications such as video streaming transmission, video playback, video broadcasting, and/or videotelephony.

The video coding system 1 described in FIG. 4 is merely an example, and the technology in this application is applicable to a video coding (for example, video encoding or video decoding) apparatus that does not necessarily include any data communication between a video encoding apparatus and a video decoding apparatus. In other examples, data is retrieved from a local memory, streamed over a network, or the like. The video encoding apparatus may encode the data and store the data into the memory, and/or the video decoding apparatus may retrieve the data from the memory and decode the data. In many examples, apparatuses that only encode data and store the data into the memory and/or retrieve the data from the memory and decode the data and that do not communicate with each other perform encoding and decoding.

In the example in FIG. 4, the source apparatus 10 includes a video source 120, a video encoder 100, and the output interface 140. In some examples, the output interface 140 may include a modulator/demodulator (modem) and/or a transmitter. The video source 120 may include a video capturing apparatus (for example, a camera), a video archive including previously captured video data, a video feed-in interface for receiving video data from a video content provider, and/or a computer graphics system for generating video data, or a combination of the foregoing video data sources.

The video encoder 100 can encode video data that is from the video source 120. In some examples, the source apparatus 10 directly sends the encoded video data to the destination apparatus 30 through the output interface 140. In another example, the encoded video data may alternatively be stored into the storage apparatus 40, so that the destination apparatus 30 subsequently accesses the encoded video data for decoding and/or playing.

In the example in FIG. 4, the destination apparatus 30 includes the input interface 340, the video decoder 300, and the display apparatus 330. In some examples, the input interface 340 includes a receiver and/or a modem. The input interface 340 may receive the encoded video data through the link 30 and/or from the storage apparatus 40. The display apparatus 330 may be integrated with the destination apparatus 30 or may be located outside the destination apparatus 30. The display apparatus 330 usually displays decoded video data. The display apparatus 330 may include a plurality of types of display apparatuses, for example, a liquid crystal display (LCD), a plasma display, an organic light-emitting diode (OLED) display, or another type of display apparatus.

Although not shown in FIG. 4, in some aspects, the video encoder 100 and the video decoder 300 may be integrated with an audio encoder and an audio decoder respectively, and may include an appropriate multiplexer-demultiplexer (MUX-DEMUX) unit or other hardware and software, to encode an audio and a video in a common data stream or a separate data stream. In some examples, if applicable, the MUX-DEMUX unit may comply with the ITU H.223 multiplexer protocol, or another protocol such as the user datagram protocol (UDP).

The video encoder 100 and the video decoder 300 each may be implemented as, for example, any one of the following plurality of circuits: one or more microprocessors, a digital signal processor (DSP), an application-specific integrated circuit (ASIC), a field programmable gate array (FPGA), discrete logic, hardware, or any combination thereof. If this application is implemented partially through software, the apparatus may store, in an appropriate non-volatile computer-readable storage medium, an instruction used for the software, and may use one or more processors to execute the instruction in hardware, to implement the technology in this application. Any one of the foregoing content (including hardware, software, a combination of hardware and software, and the like) may be considered as one or more processors. The video encoder 100 and the video decoder 300 each may be included in one or more encoders or decoders, and either the encoder or the decoder may be integrated into a part of a combined encoder/decoder (codec) in a corresponding apparatus.

In this application, the video encoder 100 may be roughly referred to as another apparatus "signaling" or "sending" some information to, for example, the video decoder 300. The term "signaling" or "transmitting" may roughly refer to transfer of a syntax element and/or other data used to decode compressed video data. The transmission may occur in real time or almost in real time. Alternatively, the communication may occur after a period of time, for example, may occur when a syntax element in an encoded bitstream is stored into a computer-readable storage medium during encoding, and then, the intra prediction apparatus may retrieve the syntax element at any time after the syntax element is stored into the medium.

The video encoder 100 and the video decoder 300 may operate according to a video compression standard, such as high efficiency video coding (HEVC), or an extension thereof, and may comply with an HEVC test model (HM). Alternatively, the video encoder 100 and the video decoder 300 may perform an operation according to other industry standards, for example, ITU-T H.264 and H.265 standards, or extensions of the standards. However, the technologies in this application are not limited to any specific encoding and decoding standards.

Figure 5A:
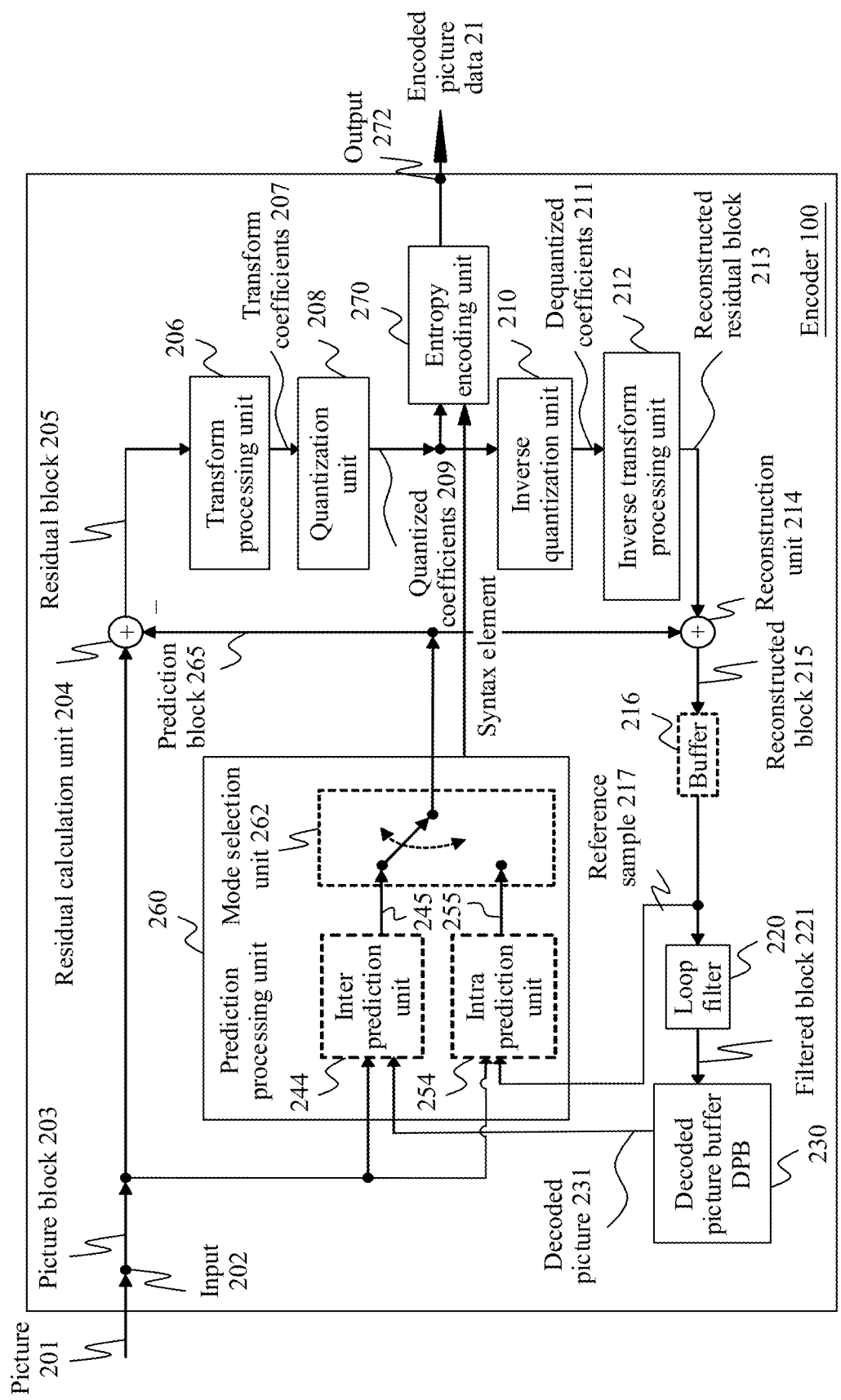
FIG. 5a is a schematic block diagram of a video encoder according to an embodiment of the present disclosure.

FIG. 5a is a schematic/conceptual block diagram of an example of a video encoder 100 configured to implement a technology in this application. In the example in FIG. 5a, the video encoder 100 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The video encoder 100 shown in FIG. 5a may also be referred to as a hybrid video encoder or a video encoder based on a hybrid video codec.

Figure 5B:
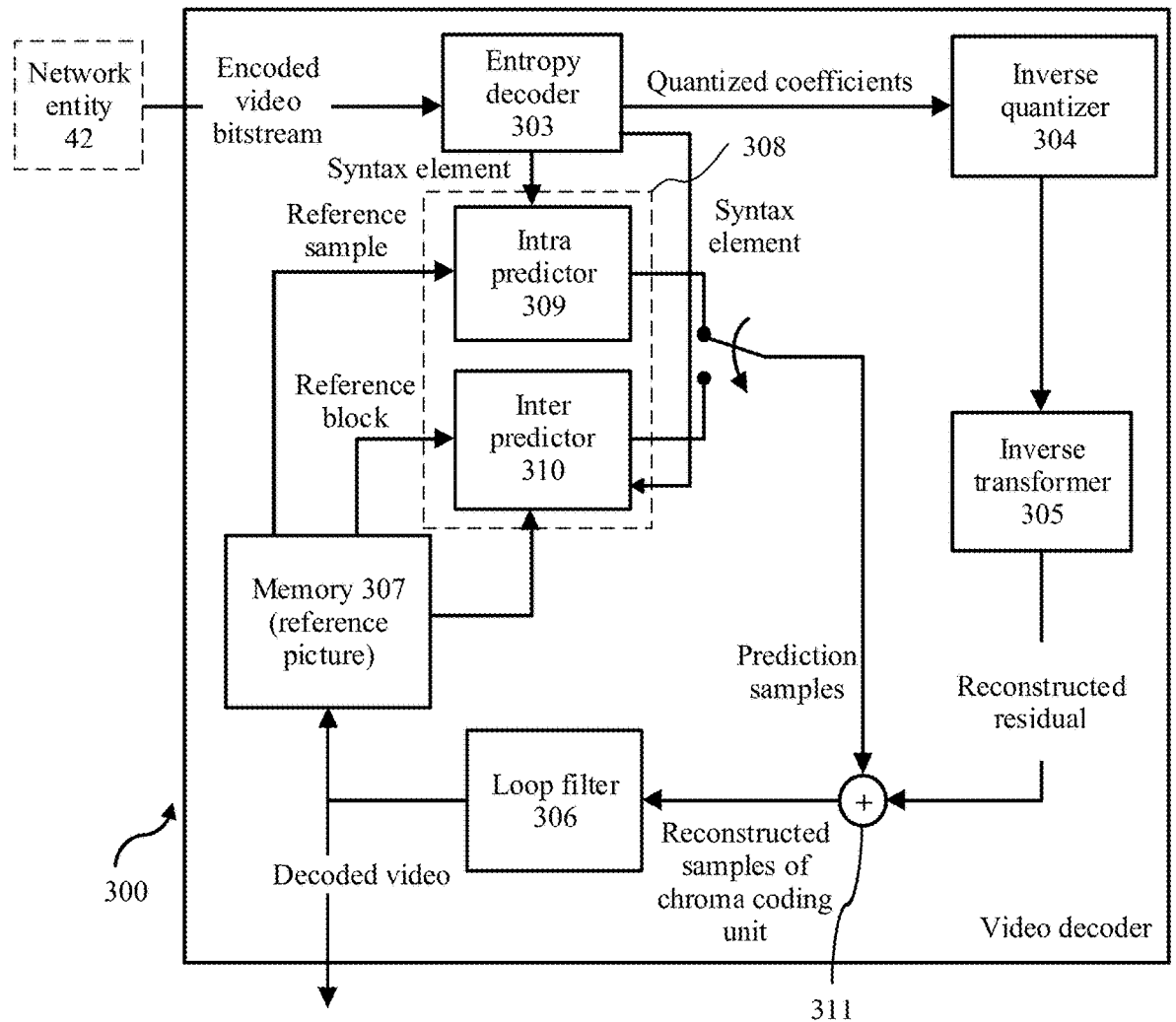
FIG. 5b is a schematic block diagram of a video decoder according to an embodiment of the present disclosure.

For example, the residual calculation unit 204, the transform processing unit 206, the quantization unit 208, the prediction processing unit 260, and the entropy encoding unit 270 form a forward signal path of the encoder 100, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder, where the backward signal path of the video encoder corresponds to a signal path of a decoder (refer to a video decoder 300 in FIG. 5b).

The encoder 100 receives, for example, via an input 202, a picture 201 or a block 203 of a picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, to distinguish the current picture from other pictures, for example, previously encoded and/or decoded pictures in a same video sequence, namely, the video sequence which also includes the current picture).

Partitioning

In an embodiment, the encoder 100 may include a partitioning unit (which is not depicted in FIG. 5a) configured to partition the picture 201 into a plurality of blocks such as blocks 203. The picture 201 is usually partitioned into a plurality of non-overlapping blocks. The partitioning unit may be configured to: use a same block size for all pictures of a video sequence and a corresponding grid defining the block size, or to change a block size between pictures or subsets or groups of pictures, and partition each picture into corresponding blocks.

In an example, the prediction processing unit 260 of the video encoder 100 may be configured to perform any combination of the foregoing partitioning technologies.

Like the picture 201, the block 203 is also or may be considered as a two-dimensional array or matrix of samples with luma values (sample values), although a size of the block 203 is less than a size of the picture 201. In other words, the block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the block 203 define a size of the block 203.

The encoder 100 shown in FIG. 5a is configured to encode the picture 201 block by block, for example, encode and predict each block 203.

Residual Calculation

The residual calculation unit 204 is configured to calculate a residual block 205 based on the picture block 203 and a prediction block 265 (details about the prediction block 265 are further provided below), for example, by subtracting sample values of the prediction block 265 from sample values of the picture block 203 sample by sample (sample by sample), to obtain the residual block 205 in a sample domain.

Transform

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled by a factor. To preserve a norm of a residual block which is processed by using forward and inverse transforms, an additional scaling factor is applied as a part of the transform process. The scaling factor is usually chosen based on some constraints, for example, the scaling factor being a power of two for a shift operation, a bit depth of the transform coefficient, and a tradeoff between accuracy and implementation costs. For example, a specific scaling factor is specified for the inverse transform by, for example, the inverse transform processing unit 212 on a side of the decoder 30 (and a corresponding inverse transform by, for example, the inverse transform processing unit 212 on a side of the encoder 20), and correspondingly, a corresponding scale factor may be specified for the forward transform by the transform processing unit 206 on a side of the encoder 20.

Quantization

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scaling may be applied to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size), and a larger quantization parameter may correspond to coarser quantization (a larger quantization step size), or vice versa. The quantization may include division by a quantization step size and corresponding quantization or inverse quantization, for example, performed by the inverse quantization unit 210, or may include multiplication by a quantization step size. Embodiments according to some standards such as HEVC may use a quantization parameter to determine the quantization step size. Generally, the quantization step size may be calculated based on a quantization parameter by using a fixed point approximation of an equation including division. Additional scaling factors may be introduced for quantization and dequantization to restore the norm of the residual block, which may get modified because of scaling used in the fixed point approximation of the equation for the quantization step size and the quantization parameter. In one example implementation, scaling of the inverse transform and dequantization may be combined. Alternatively, customized quantization tables may be used and signaled from an encoder to a decoder, for example, in a bitstream. The quantization is a lossy operation, where the loss increases with increasing quantization step sizes.

The inverse quantization unit 210 is configured to apply inverse quantization of the quantization unit 208 on quantized coefficients to obtain dequantized coefficients 211, for example, apply, based on or by using a same quantization step size as the quantization unit 208, the inverse of a quantization scheme applied by the quantization unit 208. The dequantized coefficients 211 may also be referred to as dequantized residual coefficients 211 and correspond to the transform coefficients 207, although usually not identical to the transform coefficients due to the loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

In an embodiment, a buffer unit 216 (or "buffer" 216 for short) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value stored in the buffer unit 216 for any type of estimation and/or prediction, for example, intra prediction.

For example, in an embodiment, the encoder 100 may be configured so that the buffer unit 216 is not only used for storing the reconstructed block 215 for intra prediction 254 but also used for the loop filter unit 220 (which is not shown in FIG. 5a), and/or so that, for example, the buffer unit 216 and the decoded picture buffer unit 230 form one buffer. In other embodiments, filtered blocks 221 and/or blocks or samples from the decoded picture buffer 230 (the blocks or samples are not shown in FIG. 5a) are used as an input or a basis for intra prediction 254.

The loop filter unit 220 (or "loop filter" 220 for short) is configured to filter the reconstructed block 215 to obtain a filtered block 221, to smooth sample transitions or improve video quality. The loop filter unit 220 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown as an in-loop filter in FIG. 5a, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 100 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter for decoding.

The decoded picture buffer (DPB) 230 may be a reference picture memory that stores reference picture data for use in video data encoding by the video encoder 100. The DPB 230 may be formed by any one of a variety of memory devices such as a dynamic random access memory (DRAM) (including a synchronous DRAM (SDRAM), a magnetoresistive RAM (MRAM), a resistive RAM (RRAM)), or other types of memory devices. The DPB 230 and the buffer 216 may be provided by a same memory device or separate memory devices. In an example, the decoded picture buffer (DPB) 230 is configured to store the filtered block 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, to be specific, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or in other words a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

In the following, prediction processing performed (for example, by using the prediction processing unit 260) and mode selection performed (for example, by using the mode selection unit 262) by an example of the encoder 100 are described in more detail.

As described above, the encoder 100 is configured to determine or select the best or an optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

The set of inter prediction modes can depend on an available reference picture (that is, at least a part of the decoded picture stored in the DBP 230) and another inter prediction parameter, for example, depending on whether the entire reference picture is used or only a part of the reference picture is used, for example, a search window region around a region of the current block, to search for a best matching reference block, and/or depending, for example, on whether sample interpolation such as half-sample and/or quarter-sample interpolation is applied.

In additional to the foregoing prediction modes, a skip mode and/or direct mode may be applied.

The prediction processing unit 260 may be further configured to split the block 203 into smaller block partitions or sub-blocks, for example, by iteratively using quadtree (QT) partitioning, binary-tree (BT) partitioning, ternary-tree (TT) partitioning, or any combination thereof, and to perform, for example, prediction for each of the block partitions or sub-blocks. Mode selection includes selection of a tree structure of the partitioned block 203 and selection of a prediction mode applied to each of the block partitions or sub-blocks.

The inter prediction unit 244 may include a motion estimation (ME) unit (which is not shown in FIG. 5a) and a motion compensation (MC) unit (which is not shown in FIG. 5a). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 31. In other words, the current picture and the previously decoded pictures 31 may be a part of or form a sequence of pictures forming the video sequence.

For example, the encoder 100 may be configured to select a reference block from a plurality of reference blocks of a same picture or different pictures of a plurality of other pictures and provide, to the motion estimation unit (which is not shown in FIG. 5a), a reference picture and/or an offset (a spatial offset) between a position (coordinates X and Y) of the reference block and a position of the current block as an inter prediction parameter. The offset is also referred to as a motion vector (MV).

The motion compensation unit is configured to obtain, for example, receive, the inter prediction parameter and to perform inter prediction based on or by using the inter prediction parameter to obtain an inter prediction block 245. Motion compensation performed by the motion compensation unit (which is not shown in FIG. 5a) may include fetching or generating the prediction block based on a motion/block vector determined through motion estimation (possibly by performing interpolations in sub-sample precision). Interpolation filtering may generate additional sample samples from known sample samples, thereby potentially increasing a quantity of candidate prediction blocks that may be used to code a picture block. Upon receiving a motion vector for a PU of the current picture block, the motion compensation unit 246 may locate a prediction block to which the motion vector points in one of the reference picture lists. The motion compensation unit 246 may also generate syntax elements associated with the blocks and video slices for use by video decoder 300 in decoding the picture blocks of the video slice.

The intra prediction unit 254 is configured to obtain, for example, receive, a picture block 203 (the current picture block) and one or more previously reconstructed blocks, for example, reconstructed neighboring blocks, of a same picture for intra estimation. The encoder 100 may be, for example, configured to select an intra prediction mode from a plurality of (predetermined) intra prediction modes.

In an embodiment, the encoder 100 may be configured to select an intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode of a block, the intra prediction unit 254 is further configured to provide an intra prediction parameter, that is, information indicating the selected intra prediction mode of the block, to the entropy encoding unit 270. In an example, the intra prediction unit 254 may be configured to perform any combination of intra prediction technologies described below.

The entropy encoding unit 270 is configured to apply (or not apply) an entropy encoding algorithm or scheme (for example, a variable-length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technology) to one or all of the quantized residual coefficients 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 300, or archived for later transmission or retrieval by the video decoder 300. The entropy encoding unit 270 may be further configured to entropy encode another syntax element for a current video slice being encoded.

Other structural variations of the video encoder 100 can be used to encode a video stream. For example, a non-transform based encoder 100 may quantize a residual signal directly without the transform processing unit 206 for some blocks or frames. In another implementation, the encoder 100 may have the quantization unit 208 and the inverse quantization unit 210 combined into a single unit.

FIG. 5b is a schematic block diagram of a video decoder according to an embodiment of the present disclosure. An entropy decoder 303 of the video decoder 300 entropy decodes a bitstream to generate a quantized coefficient and some syntax elements. The entropy decoder 303 forwards the syntax elements to a prediction processing unit 308. The video decoder 300 may receive syntax elements/a syntax element at a video slice level and/or a picture block level. In this application, in an example, the syntax element herein may include intra prediction data related to a chroma coding tree node, the intra prediction data may include a first identifier qtbtt_dual_tree_intra_flag and a second identifier sps_cclm_enabled_flag, the first identifier is used to indicate whether a separation tree structure is used for an intra picture in a video sequence, and the second identifier is used to indicate whether to allow CCLM to be performed on a chroma block in a video sequence. In an embodiment, the inter prediction data may further include a size and a split flag of a chroma coding tree node, and the split flag may be set to different values to indicate that different split modes are used for the chroma coding tree node. In an embodiment, another syntax element may be further included.

The entropy decoder 303 entropy decodes the bitstream to obtain the first identifier qtbtt_dual_tree_intra_flag and the second identifier sps_cclm_enabled_flag. If the first identifier indicates that the separation tree structure is used for the intra picture, and the second identifier indicates allowing CCLM to be performed on a chroma block in the video sequence, the entropy decoder 303 continues to parse the size and the split flag of the chroma coding tree node from the bitstream, and an intra predictor 309 determines the split mode of the chroma coding tree node based on the split flag, and determines, based on the size and the split mode of the chroma coding tree node, whether to allow CCLM to be performed on a chroma coding unit included in the chroma coding tree node. The entropy decoder 303 parses a first index CuPreMode of the chroma coding unit from the bitstream. If a value of the first index is equal to MODE_INTRA, the entropy decoder 303 continues to parse a third identifier pcm_flag from the bitstream. If the third identifier indicates that no PCM mode is used for the chroma coding unit, the entropy decoder 303 parses a second index intra_chroma_pred_mode from the bitstream. The intra predictor 309 determines a prediction mode of the chroma coding unit based on the second index intra_chroma_pred_mode and a prediction mode of a luma coding unit corresponding to the chroma coding unit, and then intra predicts the chroma coding unit based on the prediction mode of the chroma coding unit to obtain prediction samples of the chroma coding unit. The entropy decoder 303 further parses the bitstream to obtain residual information of the chroma coding unit.

A dequantizer 304 and an inverse converter 305 process the residual information of the chroma coding unit to obtain reconstructed residuals of the chroma coding unit.

After the intra predictor 309 generates the prediction samples used for the chroma coding unit, the video decoder 300 adds the reconstructed residuals from the inverse converter 305 and the prediction samples generated by the intra predictor 310, to obtain reconstructed samples of a chroma coding unit, that is, a decoded picture block. A summer 311 represents a component that performs a summation operation. When necessary, a loop filter (in or after a decoding loop) may be further used to smooth sample transitions, or otherwise improve video quality. A filter unit 306 may represent one or more loop filters, for example, a deblocking filter, an adaptive loop filter (ALF), and a sample adaptive offset (SAO) filter. Although the filter unit 306 is shown as an in-loop filter in FIG. 5b, in another implementation, the filter unit 306 may be implemented as a post-loop filter. In an example, the filter unit 306 is applicable to block reconstruction to reduce block distortion, and this result is output as a decoded video stream. In addition, a decoded picture block in a given frame or picture may be further stored in a decoded picture buffer 307, and the decoded picture buffer 307 stores a reference picture used for subsequent motion compensation. The decoded picture buffer 307 may be a part of a memory, and may further store a decoded video for subsequent presentation on a display apparatus (for example, the display apparatus 330 in FIG. 4). Alternatively, the decoded picture buffer 307 may be separated from such a memory.

It should be understood that another structural variant of the video decoder 300 may be used to decode an encoded video bitstream. For example, the video decoder 300 may generate an output video stream, without processing by the filter unit 306. Alternatively, for some picture blocks or picture frames, the entropy decoder 303 of the video decoder 300 does not obtain a quantized coefficient through decoding, and correspondingly, processing by the dequantizer 304 and the inverse transformer 305 is not required.

Figure 5C:
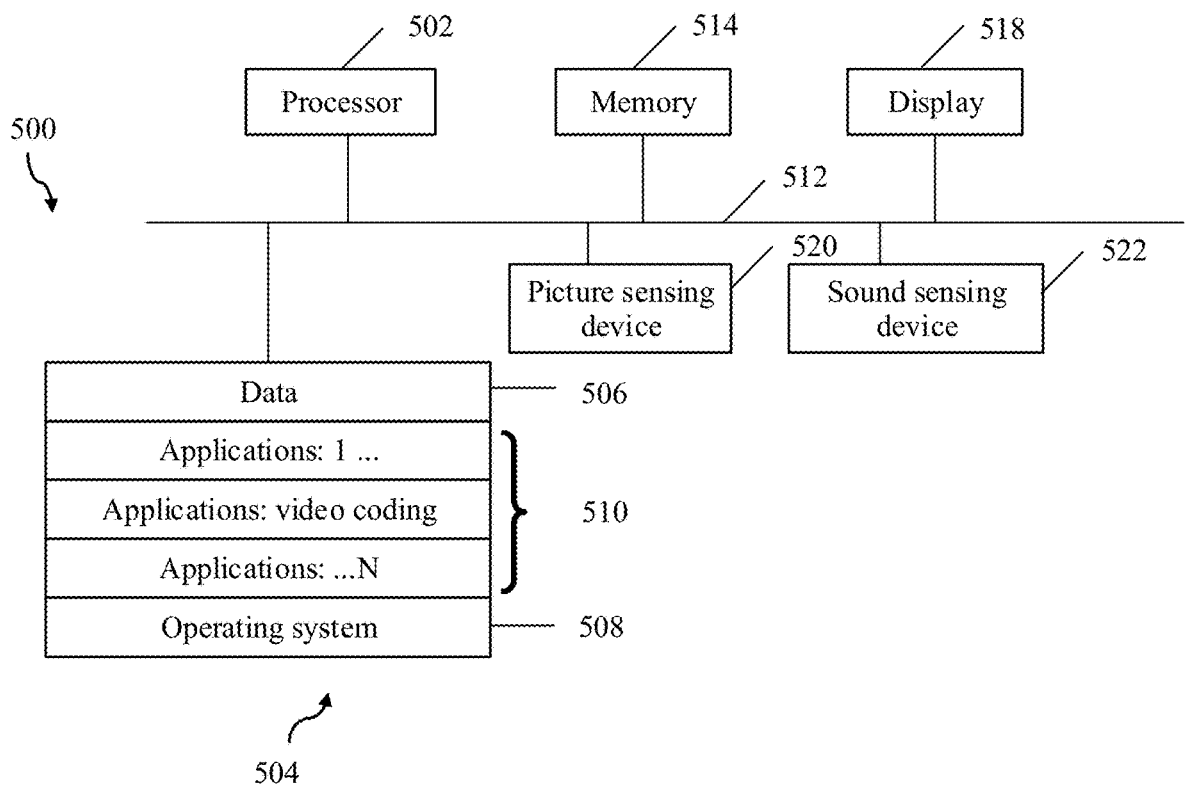
FIG. 5c is a block diagram of an example of an encoding apparatus or a decoding apparatus according to an embodiment of the present disclosure.

FIG. 5c is a simplified block diagram of an apparatus 500 that may be used as either or two of the source device 10 and the destination device 30 in FIG. 4 according to an example embodiment. The apparatus 500 may implement the technologies of this application. The apparatus 500 may be in a form of a computing system including a plurality of computing devices, or in a form of a single computing device such as a mobile phone, a tablet computer, a laptop computer, or a desktop computer.

A processor 502 of the apparatus 500 may be a central processing unit. Alternatively, a processor 502 may be any other type of device or a plurality of devices that can control or process information and that are existing or to be developed in the future. As shown in the figure, although the disclosed implementations can be practiced with a single processor such as the processor 502, advantages in speed and efficiency can be achieved by using more than one processor.

In an implementation, a memory 504 of the apparatus 500 may be a read-only memory (ROM) device or a random access memory (RAM) device. Any other appropriate type of storage device can be used as the memory 504. The memory 504 can include code and data 506 that is accessed by the processor 502 by using a bus 512. The memory 504 can further include an operating system 508 and application programs 510. The application programs 510 include at least one program that allows the processor 502 to perform the methods described in this specification. For example, the application programs 510 may include applications 1 to N, and the applications 1 to N further include a video coding application that performs the method described in this specification. The apparatus 500 may also include an additional memory in a form of a secondary storage 514. The secondary storage 514 may be, for example, a memory card used with a mobile computing device. Because the video communication sessions may contain a large amount of information, all or some of these information can be stored in the secondary storage 514 and loaded into the memory 504 as needed for processing.

The apparatus 500 can also include one or more output devices, such as a display 518. In an example, the display 518 may be a touch sensitive display that combines a display with a touch sensitive element that is operable to sense touch inputs. The display 518 can be coupled to the processor 502 by using the bus 512. Other output devices that allow a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 may also include or be connected to a picture sensing device 520. The picture sensing device 520 is, for example, a camera or any other picture sensing device 520 that can sense a picture and that is existing or to be developed in the future. The picture is, for example, a picture of a user who runs the apparatus 500. The picture sensing device 520 may be placed directly facing a user who runs the apparatus 500. In an example, a position and an optical axis of the picture sensing device 520 may be configured so that a field of view of the picture sensing device 520 includes a region closely adjacent to the display 518 and the display 518 can be seen from the region.

The apparatus 500 may also include or be in communication with a sound sensing device 522, for example, a microphone or any other sound sensing device that is existing or to be developed in the future and that can sense sounds near the apparatus 500. The sound sensing device 522 may be placed directly facing a user who runs the apparatus 500, and may be configured to receive a sound, for example, a voice or another sound, made by the user when running the apparatus 500.

Although FIG. 5c depicts the processor 502 and the memory 504 of the apparatus 500 as being integrated into a single unit, other configurations may be utilized. Running of the processor 502 may be distributed in a plurality of machines (each machine has one or more processors) that can be directly coupled, or distributed in a local region or another network. The memory 504 can be distributed across a plurality of machines such as a network-based memory or a memory in a plurality of machines on which the apparatus 500 is run. Although depicted herein as a single bus, the bus 512 of the apparatus 500 can include a plurality of buses. Further, the secondary storage 514 can be directly coupled to the other components of the apparatus 500 or can be accessed over a network and can include a single integrated unit such as a memory card or a plurality of units such as a plurality of memory cards. The apparatus 500 can thus be implemented in a wide variety of configurations.

Figure 6:
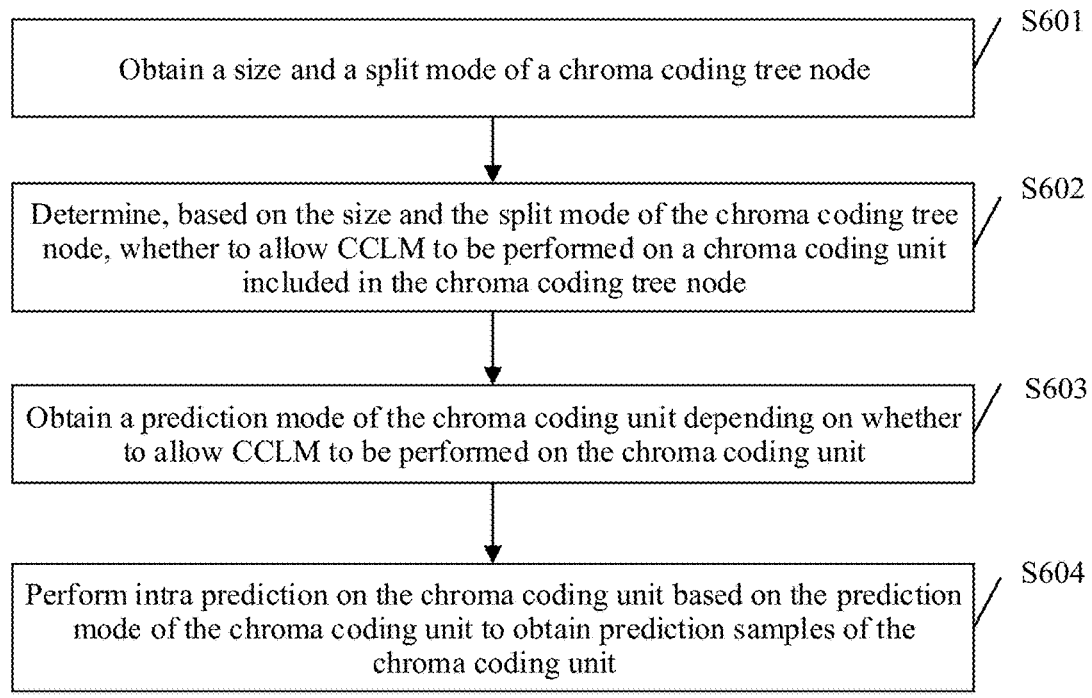
FIG. 6 is a schematic flowchart of an intra prediction method for a video sequence according to an embodiment of the present disclosure.
Figure 7:
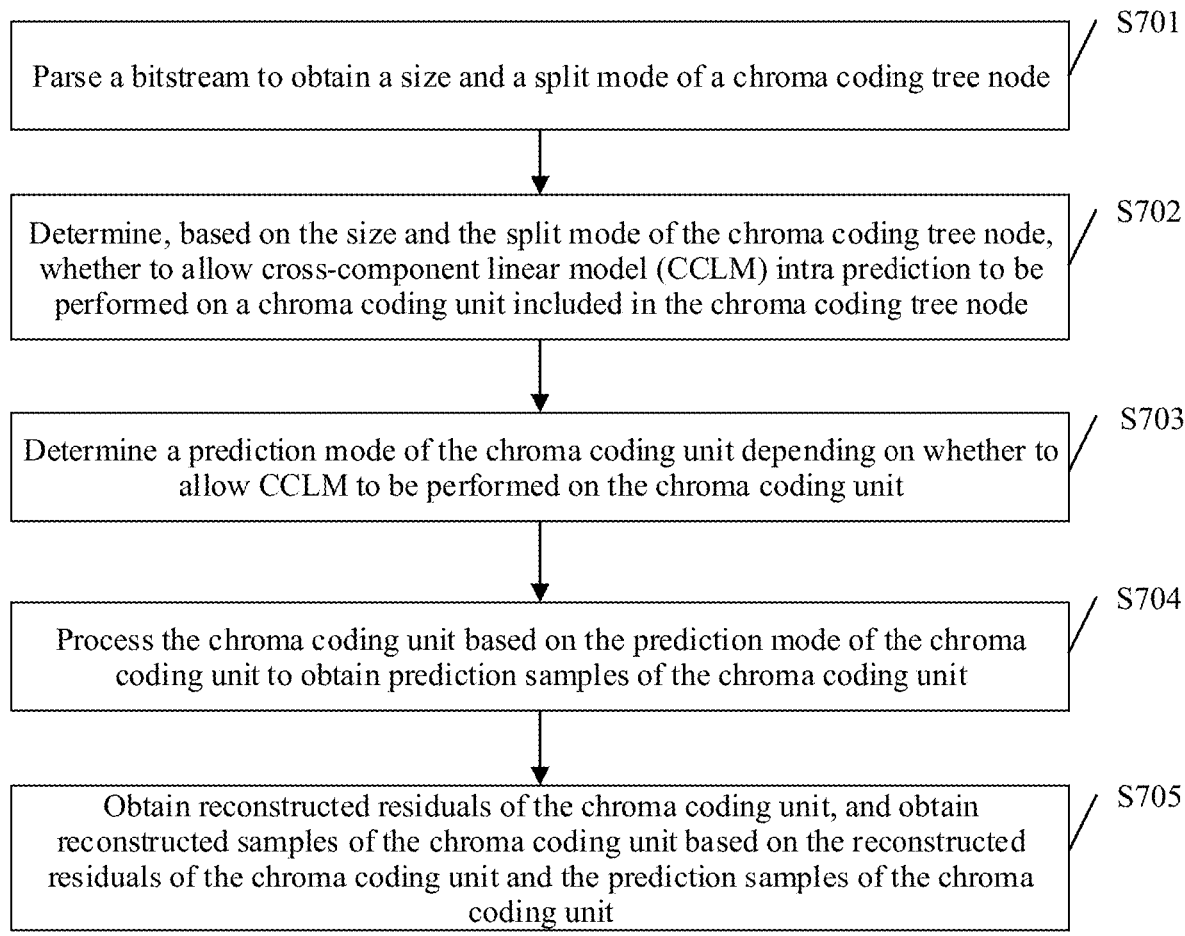
FIG. 7 is a schematic flowchart of an intra prediction method for a video sequence according to an embodiment of the present disclosure.

It should be noted that the encoder shown in FIG. 5a, the decoder shown in FIG. 5b, and the apparatus shown in FIG. 5c may perform some or all of the following method embodiments shown in FIG. 6 and FIG. 7.

FIG. 6 is a schematic flowchart of an intra prediction method for a video sequence according to an embodiment of the present disclosure. As shown in FIG. 6, the method includes the following operations.

Operation S601. Obtain a size and a split mode of a chroma coding tree node.

Specifically, a corresponding syntax element in a bitstream is parsed to obtain the size and the split mode of the chroma coding tree node. The split mode of the chroma coding tree node may include at least one of no splitting, a quadtree split, a horizontal binary split, a horizontal ternary split, a vertical binary split, and a vertical ternary split. Certainly, there may alternatively be another split mode. This is not limited in the present disclosure.

It should be noted herein that a format of the video sequence in this embodiment of the present disclosure may be a YUV4:2:0 format, a YUV4:2:2 format, or a YUV4:2:4 format.

Operation S602. Determine, based on the size and the split mode of the chroma coding tree node, whether to allow CCLM to be performed on a chroma coding unit included in the chroma coding tree node.

The chroma coding unit included in the chroma coding tree node is a chroma coding unit in a picture region corresponding to the chroma coding tree node. If the chroma coding tree node is not split, the chroma coding tree node includes one chroma coding unit. If the chroma coding tree node is split into child nodes, the chroma coding unit included in the chroma coding tree node is chroma coding unit corresponding to all coding tree leaf nodes of the chroma coding tree node.

In an embodiment, the size of the chroma coding tree node is M×N, and the determining, based on the size and the split mode of the chroma coding tree node, whether to allow CCLM to be performed on a chroma coding unit included in the chroma coding tree node further includes:

when both M and N are equal to a preset threshold T1, if the split mode of the chroma coding tree node meets a first preset condition, determining to allow CCLM to be performed on the chroma coding unit; or if the split mode of the chroma coding tree node does not meet a first preset condition, determining not to allow CCLM to be performed on the chroma coding unit, where the first preset condition includes no splitting or a quadtree split mode, and the threshold T1 is, for example, 64 or 32; or when M is equal to T1 and N is equal to T1/2, if the split mode of the chroma coding tree node meets a second preset condition, determining to allow CCLM to be performed on the chroma coding unit; or if the split mode of the chroma coding tree node does not meet a second preset condition, determining not to allow CCLM to be performed on the chroma coding unit, where the second preset condition includes no splitting or a vertical binary split mode.

More specifically, when the first preset condition is the no splitting mode or the quadtree split mode, "if the split mode of the chroma coding tree node meets a first preset condition" is "if the split mode of the chroma coding tree node is the no splitting mode or the quadtree split mode". When the second preset condition is the no splitting mode or the vertical binary split mode, "if the split mode of the chroma coding tree node meets a second preset condition" is "if the split mode of the chroma coding tree node is the no splitting mode or the vertical binary split mode". In another embodiment, the first preset condition may alternatively be no splitting, a quadtree split mode, or a horizontal binary split mode. In another embodiment, the second preset condition may alternatively be no splitting, a vertical binary split mode, or a horizontal binary split mode.

If the current chroma coding tree node is not split, coding mode information of the chroma coding unit included in the current chroma coding tree node is further parsed, and decoding and reconstruction are completed. Otherwise, the current chroma coding tree node is split into a plurality of nodes based on the split mode of the current chroma coding tree node.

It should be noted herein that, if a separation tree structure is used for an intra picture, a chroma coding tree node whose size is T1×(T1/2) can be obtained only by splitting a chroma coding tree node whose size is T1×T1 by using the horizontal binary split mode; therefore, that "the size of the chroma coding tree node is T1×(T1/2)" is equivalent to that a split mode of a parent node (that is, the chroma coding tree node whose size is T1×T1) of the chroma coding tree node is the horizontal binary split mode.

For example, it is assumed that the size of the chroma coding tree node is 64×64. When a luma block of the chroma coding tree node whose size is 64×64 is split by using a quadtree split mode, as shown in (a) of FIG. 2, if a split mode of the chroma coding tree node is a quadtree split mode, that is, the quadtree split mode is used for a chroma block of the chroma coding tree node, as shown in (d) of FIG. 2, CCLM may be performed on a chroma node 0 after a luma node 0 is reconstructed, CCLM may be performed on a chroma node 1 after a luma node 1 is reconstructed, and so on. For another example, if the split mode of the chroma coding tree node is no splitting, that is, the chroma block of the chroma coding tree node is not split, as shown in (e) of FIG. 2, the chroma block may be split into four sub-regions p0, p1, p2, and p3, and intra prediction of p0, p1, p2, and p3 is completed in sequence. CCLM may be performed on the chroma region p0 after the luma node 0 is reconstructed, CCLM may be performed on the chroma region p1 before the luma node 1 is reconstructed, and so on.

If the chroma block of the chroma coding tree node whose size is 64×64 is first split by using a horizontal binary split mode, a chroma node whose size is 64×32 on the upper part is split by using a vertical binary split mode, and a chroma node whose size is 64×32 on the lower part is not split, as shown in (f) of FIG. 2, CCLM can be performed on a chroma node 0 after a luma node 0 is reconstructed, CCLM can be performed on a chroma node 1 after a luma node 1 is reconstructed, CCLM can be performed on a region p0 of a chroma node 2 after a luma node 2 is reconstructed, and CCLM can be performed on a region p 1 of the chroma node 2 after a luma node 3 is reconstructed. Therefore, when the chroma block of the chroma coding tree node whose size is 64×64 is not split or is split by using the quadtree split mode, or the chroma block of the chroma coding tree node whose size is 64×32 is not split or is split by using the vertical binary split mode, a processing latency for performing CCLM on the chroma node does not exceed a processing time of one luma region whose size is 32×32.

In this embodiment, a split mode that can be used by the luma coding tree node whose size is T1×T1 may be limited to including only the no splitting mode and the quadtree split mode. This limitation can be implemented by a limitation that a maximum binary tree node size (for example, MaxBtSizeY in VTM5) of an I-frame picture cannot exceed T1/2 and a maximum ternary tree node size (for example, MaxTtSizeYin VTM5) cannot exceed T1/2.

Further, no ISP mode is used for a luma coding unit whose size is T1×T1 and that is included in the luma coding tree node corresponding to the chroma coding tree node.

In an embodiment, it is determined, based on the size and the split mode of the chroma coding tree node, whether to allow CCLM to be performed on the chroma coding unit included in the chroma coding tree node. In addition, whether to allow CCLM to be performed on the chroma coding unit included in the chroma coding tree node is further determined based on a split mode of the luma coding tree node corresponding to the chroma coding tree node.

In an embodiment, the determining, based on the size and the split mode of the chroma coding tree node, whether to allow cross-component linear model (CCLM) intra prediction to be performed on the chroma coding unit included in the chroma coding tree node includes:

determining, based on the size and the split mode of the chroma coding tree node, a split mode of a luma coding tree node corresponding to the chroma coding tree node, and whether to allow an intra sub-partition ISP mode to be used for a corresponding luma block when a luma coding tree node is not split, whether to allow CCLM to be performed on the chroma coding unit included in the chroma coding tree node, where the case that the luma coding tree node is not split corresponds to one luma coding unit; therefore, the luma block corresponding to the case that the luma coding tree node is not split is the luma block of the luma coding unit corresponding to the luma coding tree node.

The luma coding tree node corresponding to the chroma coding tree node is a luma coding tree node whose size is T1×T1 in a luma coding tree in a separation tree in which the chroma coding tree is located. For example, when a separation tree is used for an intra picture in VVC draft 5, a 64×64 coding tree node is split by using the separation tree, and the separation tree includes a luma coding tree and a chroma coding tree. If T1 is set to 64, the luma coding tree node corresponding to the chroma coding tree node is a root node of the luma coding tree of the separation tree in which the chroma coding tree is located.

In an embodiment, the size of the chroma coding tree node is M×N, and the determining, based on the size and the split mode of the chroma coding tree node, a split mode of a luma coding tree node corresponding to the chroma coding tree node, and whether to allow an intra sub-partition ISP mode to be used for a corresponding luma block when a luma coding tree node is not split, whether to allow CCLM to be performed on the chroma coding unit included in the chroma coding tree node includes:

when the split mode of the chroma coding tree node meets any one condition in a third preset condition, determining not to allow CCLM to be performed on the chroma coding unit;

when the split mode of the chroma coding tree node does not meet a third preset condition, M is equal to T1, and N is equal to T1, if the split mode of the chroma coding tree node meets a first preset condition, determining to allow CCLM to be performed on the chroma coding unit; or if the split mode of the chroma coding tree node does not meet a first preset condition, determining not to allow CCLM to be performed on the chroma coding unit, where the first preset condition includes no splitting or a quadtree split mode; or when the split mode of the chroma coding tree node does not meet a third preset condition, M is equal to T1, N is equal to T1/2, if the split mode of the chroma coding tree node meets a second preset condition, determining to allow CCLM to be performed on the chroma coding unit; or if the split mode of the chroma coding tree node does not meet a second preset condition, determining not to allow CCLM to be performed on the chroma coding unit, where the second preset condition includes no splitting or a vertical binary split mode.

In an embodiment, the third preset condition includes one or any combination of the following condition 1 to condition 13, and condition 1 to condition 13 are as follows:

Condition 1: The split mode of the luma coding tree node corresponding to the chroma coding tree node is no splitting, and an ISP mode is used for a luma block of the luma coding tree node, where a size of the luma coding tree node is T1×T1 (where the luma coding tree node and the chroma coding tree node belong to a same separation tree, that is, coordinates of the top-left corner of the luma coding tree node are the same as coordinates of the top-left corner of a root node of the chroma coding tree).

Condition 2: The split mode of the luma coding tree node corresponding to the chroma coding tree node is no splitting, an ISP mode is used for a luma block of the luma coding tree node, and the chroma coding tree node is split into child nodes, where the size of the chroma coding tree node, a size of the luma coding tree node, and a size of the luma block are all T1×T1.

Condition 3: The split mode of the luma coding tree node corresponding to the chroma coding tree node is no splitting, a horizontal ISP mode is used for a luma block of the luma coding tree node, and the chroma coding tree node is split into child nodes by using one of a vertical binary split mode, a vertical ternary split mode, or a quadtree split mode, where the size of the chroma coding tree node, a size of the luma coding tree node, and a size of the luma block are all T1×T1.

Condition 4: The split mode of the luma coding tree node corresponding to the chroma coding tree node is no splitting, a horizontal ISP mode is used for a luma block of the luma coding tree node, and the chroma coding tree node is split into child nodes by using one of a horizontal ternary split mode, a vertical binary split mode, a vertical ternary split mode, or a quadtree split mode, where the size of the chroma coding tree node, a size of the luma coding tree node, and a size of the luma block are all T1×T1.

Condition 5: The split mode of the luma coding tree node corresponding to the chroma coding tree node is no splitting, a horizontal ISP mode is used for a luma block of the luma coding tree node, and the chroma coding tree node is split into child nodes by using one of a vertical binary split mode, a vertical ternary split mode, or a horizontal ternary split mode, where a size of the luma coding tree node is T1×T1, and the size of the chroma coding tree node is T1×(T1/2).

Condition 6: The split mode of the luma coding tree node corresponding to the chroma coding tree node is no splitting, a vertical ISP mode is used for a luma block of the luma coding tree node, and the chroma coding tree node is split into child nodes by using one of a horizontal binary split mode, a horizontal ternary split mode, or a quadtree split mode, where both the size of the chroma coding tree node and a size of the luma coding tree node are T1×T1.

Condition 7: The split mode of the luma coding tree node corresponding to the chroma coding tree node is no splitting, a vertical ISP prediction mode is used for a luma block of the luma coding tree node, and the chroma coding tree node is split into child nodes by using one of a vertical ternary split mode, a horizontal binary split mode, a horizontal ternary split mode, or a quadtree split mode, where the size of the chroma coding tree node, a size of the luma coding tree node, and a size of the luma block are all T1×T1.

Condition 8: The split mode of the luma coding tree node corresponding to the chroma coding tree node is no splitting, a vertical ISP mode is used for a luma block of the luma coding tree node, and the chroma coding tree node is split into child nodes by using one of a horizontal binary split mode, a horizontal ternary split mode, or a vertical ternary split mode, where a size of the luma coding tree node and a size of the luma block are both T1×T1, and the size of the chroma coding tree node is T1×(T1/2).

Condition 9: The luma coding tree node corresponding to the chroma coding tree node is split into child nodes by using a horizontal binary split mode, where a size of the luma coding tree node is T1×T1.

Condition 10: The luma coding tree node corresponding to the chroma coding tree node is split into child nodes by using a vertical binary split mode, where a size of the luma coding tree node is T1×T1.

Condition 11: The luma coding tree node corresponding to the chroma coding tree node is split into child nodes by using a horizontal ternary split mode, where a size of the luma coding tree node is T1×T1.

Condition 12: The luma coding tree node corresponding to the chroma coding tree node is split into child nodes by using a vertical ternary split mode, where a size of the luma coding tree node is T1×T1.

Condition 13: The split mode used for the luma coding tree node corresponding to the chroma coding tree node is a split mode other than no splitting and a quadtree split, where a size of the luma coding tree node is T1×T1.

It should be noted that, that the split mode used for the luma coding tree node is a split mode other than no splitting and a quadtree split means that the split mode used for the luma coding tree node is not a quadtree split or no splitting.

It should be noted herein that in a quadtree-multi-type tree (QT-MTT) structure, split modes allowed for a node include a maximum of no splitting, a horizontal binary split mode, a vertical binary split mode, a horizontal ternary split mode, a vertical ternary split mode, and a quadtree split mode; therefore, "the chroma coding tree node is split into child nodes by using one of a vertical binary split mode, a vertical ternary split mode, or a quadtree split mode" in condition 3 may be equivalently described, in the QT-MTT structure, as "the split mode used for the chroma coding tree node is not a horizontal binary split mode, a horizontal ternary split mode, or no split".

In an embodiment, on a premise that the split mode used for the luma coding tree node corresponding to the chroma coding tree node is limited to no splitting and a quadtree split, the third preset condition includes at least one of conditions 1 to 9.

It should be noted herein that, that the chroma coding tree node is split into child nodes specifically means that the chroma coding tree node is split into child nodes by using one of the horizontal binary split mode, the vertical binary split mode, the horizontal ternary split mode, the vertical ternary split mode, and the quadtree split mode.

In an embodiment, the third preset condition includes:

The split mode of the luma coding tree node corresponding to the chroma coding tree node is no splitting, and an ISP prediction mode is used for a luma block of the luma coding tree node, where a size of the luma coding tree node is T1×T1.

In an embodiment, the third preset condition includes:

The split mode of the luma coding tree node corresponding to the chroma coding tree node is no splitting, an ISP mode is used for a luma block of the luma coding tree node, and the chroma coding tree node is split into child nodes, where the size of the chroma coding tree node, a size of the luma coding tree node, and a size of the luma block are all T1×T1.

In an embodiment, the third preset condition includes:

The split mode of the luma coding tree node corresponding to the chroma coding tree node is no splitting, an ISP mode is used for a luma block of the luma coding tree node, and the chroma coding tree node is split into child nodes; or the split mode of the luma coding tree node is one of a horizontal binary split mode and a vertical binary split mode, where the size of the chroma coding tree node, a size of the luma coding tree node, and a size of the luma block are all T1×T1.

In an embodiment, the third preset condition includes one or more of conditions 1 to 13.

In an embodiment, the third preset condition includes condition 1 or condition 13.

In an embodiment, the third preset condition includes condition 2 or condition 13.

In an embodiment, the third preset condition includes condition 3, condition 5, condition 6, condition 8, and condition 13.

In an embodiment, the third preset condition includes condition 4, condition 5, condition 7, condition 8, and condition 13.

In an embodiment, the third preset condition includes condition 4, condition 5, condition 7, condition 8, condition 9, condition 10, condition 11, and condition 12.

In a possible embodiment, T1 may be equal to 64. That is, if the size of the chroma coding tree node is T1×T1, the size of the chroma coding tree node is actually 64×64. If the size of the chroma coding tree node is T1×(T1/2), the size of the chroma coding tree node is actually 64×32. If the size of the luma coding tree node is T1×T1, the size of the luma coding tree node is actually 64×64. If the size of the luma block of the luma coding tree node is T1×T1, the size of the chroma coding tree node is actually 64×64.

In an embodiment, after it is determined, based on the size and the split mode of the chroma coding tree node, whether to allow CCLM to be performed on the chroma coding unit included in the chroma coding tree node, it is determined whether the chroma coding unit satisfies the third preset condition, so as to further determine whether to allow CCLM to be performed on the chroma coding unit included in the chroma coding tree node.

Operation S603. Obtain a prediction mode of the chroma coding unit depending on whether to allow CCLM to be performed on the chroma coding unit.

The prediction mode of the chroma coding unit includes at least one of a direct mode, a planar mode (planar mode), a direct current mode (DC mode), an angular mode (angular mode), a CCLM mode, a pulse-code modulation (PCM) mode, and an intra block copy (IBC) mode.

Specifically, a syntax element CuPredMode of the chroma coding unit is parsed from a syntax table. If a value of CuPredMode of the chroma coding unit is equal to MODE_INTRA, pcm_flag is obtained through parsing, where pcm_flag is used to indicate whether a PCM mode is used for the chroma coding unit. If it is determined, based on pcm_flag, that no PCM mode is used for the chroma coding unit, a syntax element intra_chroma_pred_mode is further parsed.

If CCLM on the chroma coding unit is not allowed, the prediction mode of the chroma coding unit may be determined, based on Table 1, by the syntax element intra_chroma_pred_mode and a luma intra prediction mode IntraPredModeY corresponding to the chroma coding unit.

TABLE 1

| intra_chroma_pred_mode | IntraredModeY[xCb + cbWidth/2][yCb + cbHeight/2] | | | | |
|---|---|---|---|---|---|
| [xCb][yCb] | 0 | 50 | 18 | 1 | X(0 ≤ X ≤ 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

If a CCLM mode is allowed for the chroma coding unit, the prediction mode of the chroma coding unit may be determined, based on Table 2, by the syntax element intra_chroma_pred_mode and the luma intra prediction mode IntraPredModeY corresponding to the chroma coding unit.

TABLE 2

| intra_chroma_pred_mode | IntraredModeY[xCb + cbWidth/2][yCb + cbHeight/2] | | | | |
|---|---|---|---|---|---|
| [xCb][yCb] | 0 | 50 | 18 | 1 | X(0 ≤ X ≤ 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X | xCb and xCr represent coordinates (which are expressed by using a quantity of corresponding luma samples) of the top-left corner of the chroma coding unit, cbWidth and cbHeight represent respectively the width and the height (which are expressed by using a quantity of corresponding luma samples) of the chroma coding unit, intra_chroma_pred_mode[xCb][yCb] represents a number of an intra prediction mode of the chroma coding unit, IntraPredModeY[xCb+cbWidth/2][yCb+cbHeight/2] represents a luma intra prediction mode of a coordinate position (xCb+cbWidth/2, yCb+cbHeight/2), and the intra prediction mode IntraPredModeC[xCb][yCb] of the chroma coding unit may be obtained by looking up Table 1 or Table 2.

Operation S604. Perform intra prediction on the chroma coding unit based on the prediction mode of the chroma coding unit to obtain prediction samples of the chroma coding unit.

In an embodiment, a first identifier qtbtt_dual_tree_intra_flag and a second identifier sps_cclm_enabled_flag are parsed from the bitstream. The first identifier is used to indicate whether a separation tree structure is used for an intra picture, and the second identifier is used to indicate whether to allow CCLM to be performed on the chroma block in the video sequence. For example, if a value of the first identifier is a first value (for example, 1 or true), the first identifier is used to indicate that a separation tree structure is used for an intra picture in the video sequence; or if a value of the first identifier is a second value (for example, 0 or false), the first identifier is used to indicate that no separation tree structure is used for an intra picture in the video sequence. If a value of the second identifier is a first value (for example, 1 or true), the second identifier is used to indicate that CCLM on the chroma block in the video sequence is allowed; or if a value of the second identifier is a second value (for example, 0 or false), the second identifier is used to indicate that CCLM on the chroma block in the video sequence is not allowed.

When both the value of the first identifier and the value of the second identifier are the first value, an intra prediction operation is performed on the chroma coding unit by using the intra prediction method of the present disclosure.

It can be learned that in the solution in this embodiment of the present disclosure, it is determined, based on the size and the split mode of the chroma coding tree node, whether to allow CCLM to be performed on the chroma coding unit included in the chroma coding tree node, thereby reducing a processing latency for performing CCLM on the chroma coding unit, and improving a throughput of a hardware decoder.

FIG. 7 is a schematic flowchart of a decoding method according to an embodiment of the present disclosure. As shown in FIG. 7, the method includes the following operations.

Operation S701. Parse a bitstream to obtain a size and a split mode of a chroma coding tree node.

Specifically, a video decoding unit decodes the bitstream to obtain a corresponding syntax element, and further determines the size and the split mode of the chroma coding tree node based on the syntax element.

Operation S702. Determine, based on the size and the split mode of the chroma coding tree node, whether to allow cross-component linear model (CCLM) intra prediction to be performed on a chroma coding unit included in the chroma coding tree node.

Operation S703. Determine a prediction mode of the chroma coding unit depending on whether to allow CCLM to be performed on the chroma coding unit.

Operation S704. Process the chroma coding unit based on the prediction mode of the chroma coding unit to obtain prediction samples of the chroma coding unit.

It should be noted that for specific descriptions of operations S701 to S704, refer to related descriptions of operations S601 to S604 in the embodiment shown in FIG. 6. Details are not described herein again.

Operation S705. Obtain reconstructed residuals of the chroma coding unit, and obtain reconstructed samples of a chroma coding unit based on the reconstructed residuals of the chroma coding unit and the prediction samples of the chroma coding unit.

Specifically, the bitstream is parsed. If residual information of the chroma coding unit is obtained through parsing, dequantization processing and inverse transformation processing are performed on the residual information of the chroma coding unit, to obtain the reconstructed residuals of the chroma coding unit; or if the residual information of the chroma coding unit is not obtained through parsing, it is determined that the reconstructed residuals of the chroma coding unit are 0. The residual information includes a coded block flag and a transform coefficient, and may further include a horizontal transform type and a vertical transform type (for example, DCT-2, DCT-7, or DCT-8). The reconstructed residuals of the chroma coding unit and the prediction samples of the chroma coding unit are added, and results of the addition are clipped to be within a preset value range (for example, 0 to 255, or 0 to 1023), to obtain the reconstructed samples of the chroma coding unit.

It can be learned that in the solution in this embodiment of the present disclosure, it is determined, based on the size and the split mode of the chroma coding tree node, whether to allow CCLM to be performed on the chroma coding unit included in the chroma coding tree node, thereby reducing a processing latency for performing CCLM on the chroma coding unit, improving a throughput of a hardware decoder, and improving video decoding efficiency.

Figure 8:
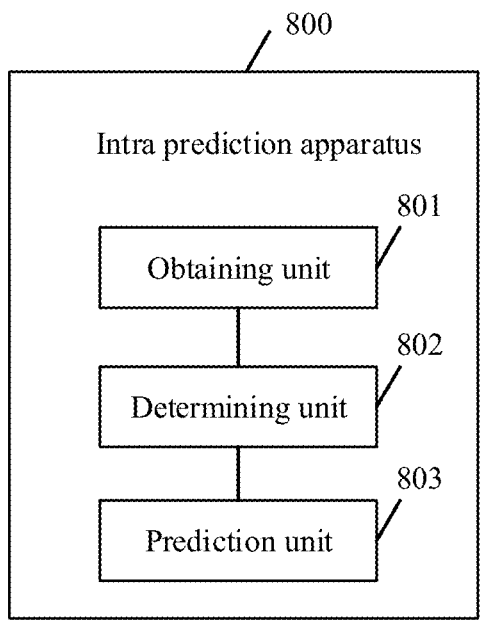
FIG. 8 is a schematic structural diagram of an intra prediction apparatus according to an embodiment of the present disclosure.

FIG. 8 is a schematic structural diagram of an intra prediction apparatus according to an embodiment of the present disclosure. As shown in FIG. 8, the intra prediction apparatus 800 includes:

an obtaining unit 801, configured to obtain a size and a split mode of a chroma coding tree node;

a determining unit 802, configured to: determine, based on the size and the split mode of the chroma coding tree node, whether to allow CCLM to be performed on a chroma coding unit included in the chroma coding tree node; and determine a prediction mode of the chroma coding unit depending on whether to allow CCLM to be performed on the chroma coding unit; and a prediction unit 803, configured to process the chroma coding unit based on the prediction mode of the chroma coding unit to obtain prediction samples of the chroma coding unit.

In an embodiment, the size of the chroma coding tree node is M×N, and in an aspect of the determining, based on the size and the split mode of the chroma coding tree node, whether to allow CCLM to be performed on a chroma coding unit included in the chroma coding tree node, the determining unit 802 is configured to:

when both M and N are equal to a preset threshold T1, if the split mode of the chroma coding tree node meets a first preset condition, determine to allow CCLM to be performed on the chroma coding unit; or if the split mode of the chroma coding tree node does not meet a first preset condition, determine not to allow CCLM to be performed on the chroma coding unit, where the first preset condition includes no splitting or a quadtree split mode.

In an embodiment, the size of the chroma coding tree node is M×N, and in an aspect of the determining, based on the size and the split mode of the chroma coding tree node, whether to allow CCLM to be performed on a chroma coding unit included in the chroma coding tree node, the determining unit 802 is configured to:

when M is equal to a T1 and N is equal to T1/2, if the split mode of the chroma coding tree node meets a second preset condition, determine to allow CCLM to be performed on the chroma coding unit; or if the split mode of the chroma coding tree node does not meet a second preset condition, determine not to allow CCLM to be performed on the chroma coding unit, where the second preset condition includes no splitting or a vertical binary split mode.

In an embodiment, in an aspect of the determining, based on the size and the split mode of the chroma coding tree node, whether to allow cross-component linear model (CCLM) intra prediction to be performed on a chroma coding unit included in the chroma coding tree node, the determining unit 802 is configured to:

determine, based on the size and the split mode of the chroma coding tree node, a split mode of a luma coding tree node corresponding to the chroma coding tree node, and whether to allow an ISP mode to be used for a corresponding luma block when a luma coding tree node is not split, whether to allow CCLM to be performed on the chroma coding unit included in the chroma coding tree node.

In an embodiment, the size of the chroma coding tree node is M×N, and in an aspect of the determining, based on the size and the split mode of the chroma coding tree node, a split mode of a luma coding tree node corresponding to the chroma coding tree node, and whether to allow an ISP mode to be used for a corresponding luma block when a luma coding tree node is not split, whether to allow CCLM to be performed on the chroma coding unit included in the chroma coding tree node, the determining unit 802 is configured to:

when the split mode of the chroma coding tree node meets a third preset condition, determine not to allow CCLM to be performed on the chroma coding unit; or when the split mode of the chroma coding tree node does not meet a third preset condition, M is equal to T1, and N is equal to T1, if the split mode of the chroma coding tree node meets a first preset condition, determine to allow CCLM to be performed on the chroma coding unit; or if the split mode of the chroma coding tree node does not meet a first preset condition, determine not to allow CCLM to be performed on the chroma coding unit, where the first preset condition includes no splitting or a quadtree split mode.

In an embodiment, the size of the chroma coding tree node is M×N, and in an aspect of the determining, based on the size and the split mode of the chroma coding tree node, a split mode of a luma coding tree node corresponding to the chroma coding tree node, and whether to allow an ISP mode to be used for a corresponding luma block when a luma coding tree node is not split, whether to allow CCLM to be performed on the chroma coding unit included in the chroma coding tree node, the determining unit 802 is configured to:

when the split mode of the chroma coding tree node meets any one condition in a third preset condition, determine not to allow CCLM to be performed on the chroma coding unit; or when the split mode of the chroma coding tree node does not meet a third preset condition, N=T1, and M=T1/2, if the split mode of the chroma coding tree node meets a second preset condition, determine to allow CCLM to be performed on the chroma coding unit; or if the split mode of the chroma coding tree node does not meet a second preset condition, determine not to allow CCLM to be performed on the chroma coding unit, where the second preset condition includes no splitting or a vertical binary split mode.

In an embodiment, the third preset condition includes one or more of condition 1, condition 2, condition 3, condition 4, condition 5, condition 6, condition 7, condition 8, condition 9, condition 10, condition 11, condition 12, and condition 13 in the example shown in FIG. 6.

In an embodiment, the third preset condition includes:
The split mode of the luma coding tree node corresponding to the chroma coding tree node is no splitting, and an ISP prediction mode is used for a luma block of the luma coding tree node, where a size of the luma coding tree node and a size of the luma block are both T1×T1.

In an embodiment, the third preset condition includes:
The split mode of the luma coding tree node corresponding to the chroma coding tree node is no splitting, an ISP mode is used for a luma block of the luma coding tree node, and the chroma coding tree node is split into child nodes, where the size of the chroma coding tree node, a size of the luma coding tree node, and a size of the luma block are all T1×T1.

In an embodiment, the third preset condition includes condition 1 and condition 13 in the example shown in FIG. 6.

In an embodiment, the third preset condition includes condition 2 and condition 13 in the example shown in FIG. 6.

In an embodiment, the third preset condition includes:
The split mode of the luma coding tree node corresponding to the chroma coding tree node is one of no splitting, a quadtree split mode, a horizontal binary split mode, and a vertical binary split mode, where the size of the luma coding tree node is T1×T1; or
the split mode of the luma coding tree node corresponding to the chroma coding tree node is no splitting, an ISP mode is used for a luma block of the luma coding tree node, and the chroma coding tree node is split into child nodes; or the split mode of the luma coding tree node is one of a horizontal binary split mode and a vertical binary split mode, where the size of the chroma coding tree node, a size of the luma coding tree node, and a size of the luma block are all T1×T1.

In an embodiment, the third preset condition includes condition 3, condition 5, condition 6, condition 8, and condition 13 in the example shown in FIG. 6.

In an embodiment, the third preset condition includes condition 4, condition 5, condition 7, condition 8, and condition 13 in the example shown in FIG. 6.

In an embodiment, the third preset condition includes condition 3, condition 5, condition 7, condition 8, condition 9, condition 10, condition 11, and condition 12 in the example shown in FIG. 6.

In an embodiment, the preset threshold T1 is equal to 64.

It should be noted that the foregoing units (the obtaining unit 801, the determining unit 802, and the prediction unit 803) are configured to perform related operations of the foregoing methods. Specifically, the obtaining unit 801 is configured to perform related content in operations S601 and S701, the determining unit 802 is configured to perform related content in operations S602, S603, S702, and S703, and the prediction unit 803 is configured to perform related content in operations S604 and S704. In other words, the obtaining unit 801 is configured to implement related functions of the entropy decoder 303 and the intra predictor 309 in FIG. 5b, and the determining unit 802 and the prediction unit 803 are configured to implement related functions of the intra predictor 309 in FIG. 5b.

In this embodiment, the intra prediction apparatus 800 is presented in a form of a unit. The "unit" herein may be an application-specific integrated circuit (ASIC), a processor and a memory that execute one or more software or firmware programs, an integrated logic circuit, and/or another device that can provide the foregoing functions.

Figure 9:
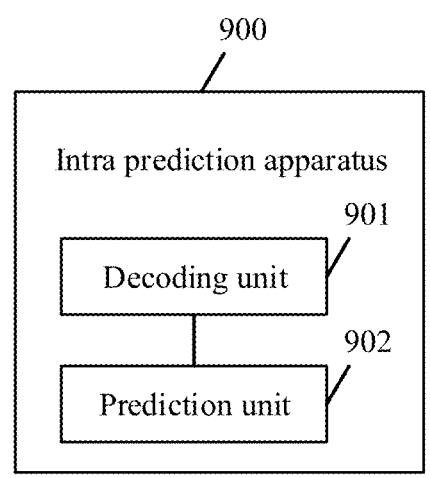
FIG. 9 is a schematic structural diagram of an intra prediction apparatus according to an embodiment of the present disclosure.

FIG. 9 is a schematic structural diagram of an intra prediction apparatus for a video sequence according to an embodiment of the present disclosure. As shown in FIG. 9, the intra prediction apparatus 900 includes:

a decoding unit 901, configured to parse a bitstream to obtain a first identifier and a second identifier, where the first identifier is used to indicate whether a separation tree structure is used for an intra picture in the video sequence, and the second identifier is used to indicate whether to allow CCLM to be performed on a chroma block in the video sequence; and a prediction unit 902, configured to: if the first identifier indicates that the separation tree structure is used for the intra picture in the video sequence, and the second identifier indicates allowing CCLM to be performed on the chroma block in the video sequence, perform a part or all of the operations in the intra prediction method for the video sequence in FIG. 6. IBC It should be noted that the foregoing units (the decoding unit 901 and the prediction unit 903) are configured to perform related operations of the foregoing method. In other words, the decoding unit 901 is configured to implement related functions of the entropy decoder 303 in FIG. 5b, and the prediction unit 902 is configured to implement related functions of the intra predictor 309 in FIG. 5b.

The embodiments of the present disclosure further provide a computer storage medium. The computer storage medium may store a program; when the program is executed, at least a part or all of the operations of any one of the intra prediction methods described in the foregoing method embodiments are included.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may include a computer readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated circuits or discrete logic circuits. Therefore, the term "processor" used in this specification may be any of the foregoing structures or any other structure suitable for implementing the technologies described in this specification. In addition, in some aspects, the functions described in the illustrative logical blocks, modules, and operations described in this specification may be provided within dedicated hardware and/or software modules configured for encoding and decoding, or may be incorporated into a combined codec. In addition, all of the technologies may be implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An intra prediction method for a video sequence, comprising:
   obtaining a size and a split mode of a chroma coding tree node;
   determining, based on the size and the split mode of the chroma coding tree node, a first condition indicating whether to allow cross-component linear model (CCLM) intra prediction to be performed on a chroma coding unit included in the chroma coding tree node;
   if it is determined that the first condition indicates to allow CCLM intra prediction based on the size and the split mode of the chroma coding tree node, determining a second condition indicating whether to allow the CCLM intra prediction to be performed on the chroma coding unit included in the chroma coding tree node based on a split mode and a size of a luma coding tree node;
   determining a prediction mode of the chroma coding unit depending on the first or the second condition indicating whether to allow CCLM to be performed on the chroma coding unit; and
   processing the chroma coding unit based on the prediction mode of the chroma coding unit to obtain prediction samples of the chroma coding unit.

2. The method according to claim 1, the determining a second condition indicating whether to allow the CCLM intra prediction to be performed on the chroma coding unit included in the chroma coding tree node based on a split mode and a size of a luma coding tree node comprises:
   determining whether a split mode of a luma coding tree node corresponding to the chroma coding tree node is no splitting, whether an intra sub-partition (ISP) prediction mode is used for a luma block of the luma coding tree node, and whether a size of the luma coding tree node is T1×T1.

3. The method according to claim 2, wherein the T1 is equal to 64.

4. The method according to claim 1, after it is determined that the first condition indicates to allow CCLM based on the size and the split mode of the chroma coding tree node, if it is determined that the second condition indicates to not allow CCLM based on a split mode and a size of a luma coding tree node, not all samples of the chroma coding unit included in the chroma coding tree node are predicted using the CCLM intra prediction.

5. The method according to claim 1, wherein the size of the chroma coding tree node is M×N, and the determining, based on the size and the split mode of the chroma coding tree node, a first condition indicating whether to allow CCLM intra prediction to be performed on a chroma coding unit included in the chroma coding tree node comprises:
when both M and N are equal to a preset threshold T1, if the split mode of the chroma coding tree node meets a first preset condition, determining to allow CCLM to be performed on the chroma coding unit; or
if the split mode of the chroma coding tree node does not meet a first preset condition, determining not to allow CCLM to be performed on the chroma coding unit, wherein
the first preset condition comprises no splitting or a quadtree split mode.

6. The method according to claim 1, wherein the size of the chroma coding tree node is M×N, and the determining, based on the size and the split mode of the chroma coding tree node, a first condition indicating whether to allow CCLM intra prediction to be performed on a chroma coding unit included in the chroma coding tree node comprises:
when M is equal to a preset threshold T1 and N is equal to T1/2, if the split mode of the chroma coding tree node meets a second preset condition, determining to allow CCLM to be performed on the chroma coding unit; or
if the split mode of the chroma coding tree node does not meet a second preset condition, determining not to allow CCLM to be performed on the chroma coding unit, wherein
the second preset condition comprises no splitting or a vertical binary split mode.

7. The method according to claim 5, wherein the preset threshold T1 is equal to 64.

8. The method according to claim 6, wherein the preset threshold T1 is equal to 64.

9. The method according to claim 1, further comprising:
before the obtaining a size and a split mode of a chroma coding tree node, parsing a bitstream to obtain a first identifier and a second identifier, wherein the first identifier is used to indicate whether a separation tree structure is used for an intra picture in a video sequence in the bitstream, and the second identifier is used to indicate whether to allow CCLM to be performed on the video sequence;
the obtaining a size and a split mode of a chroma coding tree node is performed if the first identifier indicates that the separation tree structure is used for the intra picture in the video sequence, and the second identifier indicates allowing CCLM to be performed on the video sequence.

10. An intra prediction apparatus for a video sequence, comprising:
a computer-readable storage medium storing instructions; and
one or more processors in communication with the storage medium and upon execution of the instructions, configures the apparatus to perform operations:
obtaining a size and a split mode of a chroma coding tree node;
determining, based on the size and the split mode of the chroma coding tree node, a first condition indicating whether to allow cross-component linear model (CCLM) intra prediction to be performed on a chroma coding unit included in the chroma coding tree node;
if it is determined that the first condition indicates to allow CCLM intra prediction based on the size and the split mode of the chroma coding tree node, determining a second condition indicating whether to allow the CCLM intra prediction to be performed on the chroma coding unit included in the chroma coding tree node based on a split mode and a size of a luma coding tree node;
determining a prediction mode of the chroma coding unit depending on the first or the second condition indicating whether to allow CCLM to be performed on the chroma coding unit; and
processing the chroma coding unit based on the prediction mode of the chroma coding unit to obtain prediction samples of the chroma coding unit.

11. The apparatus according to claim 10, the determining a second condition indicating whether to allow the CCLM intra prediction to be performed on the chroma coding unit included in the chroma coding tree node based on a split mode and a size of a luma coding tree node comprises:
determining whether a split mode of a luma coding tree node corresponding to the chroma coding tree node is no splitting, whether an intra sub-partition (ISP) prediction mode is used for a luma block of the luma coding tree node, and whether a size of the luma coding tree node is T1×T1.

12. The apparatus according to claim 11, wherein the T1 is equal to 64.

13. The apparatus according to claim 10, after it is determined that the first condition indicates to allow CCLM based on the size and the split mode of the chroma coding tree node, if it is determined that the second condition indicates to not allow CCLM based on a split mode and a size of a luma coding tree node, not all samples of the chroma coding unit included in the chroma coding tree node are predicted using the CCLM intra prediction.

14. The apparatus according to claim 10, wherein the size of the chroma coding tree node is M×N, and the determining, based on the size and the split mode of the chroma coding tree node, a first condition indicating whether to allow CCLM intra prediction to be performed on a chroma coding unit included in the chroma coding tree node comprises:
when both M and N are equal to a preset threshold T1, if the split mode of the chroma coding tree node meets a first preset condition, determining to allow CCLM to be performed on the chroma coding unit; or
if the split mode of the chroma coding tree node does not meet a first preset condition, determining not to allow CCLM to be performed on the chroma coding unit, wherein
the first preset condition comprises no splitting or a quadtree split mode.

15. The apparatus according to claim 10, wherein the size of the chroma coding tree node is M×N, and the determining, based on the size and the split mode of the chroma coding tree node, a first condition indicating whether to allow CCLM intra prediction to be performed on a chroma coding unit included in the chroma coding tree node comprises:

when M is equal to a preset threshold T1 and N is equal to T1/2, if the split mode of the chroma coding tree node meets a second preset condition, determining to allow CCLM to be performed on the chroma coding unit; or if the split mode of the chroma coding tree node does not meet a second preset condition, determining not to allow CCLM to be performed on the chroma coding unit, wherein the second preset condition comprises no splitting or a vertical binary split mode.

16. The apparatus according to claim 14, wherein the preset threshold T1 is equal to 64.

17. The apparatus according to claim 15, wherein the preset threshold T1 is equal to 64.

18. The apparatus according to claim 10, wherein one or more processors configures the apparatus to perform operations:

before the obtaining a size and a split mode of a chroma coding tree node, parsing a bitstream to obtain a first identifier and a second identifier, wherein the first identifier is used to indicate whether a separation tree structure is used for an intra picture in a video sequence in the bitstream, and the second identifier is used to indicate whether to allow cross-component linear model intra prediction model, CCLM, to be performed on the video sequence;

the obtaining (S601; S701) a size and a split mode of a chroma coding tree node is performed if the first identifier indicates that the separation tree structure is used for the intra picture in the video sequence, and the second identifier indicates allowing CCLM to be performed on the video sequence.

\* \* \* \* \*